United States Patent
Shimoda et al.

(10) Patent No.: US 9,243,315 B2
(45) Date of Patent: Jan. 26, 2016

(54) HIGH-STRENGTH ZN—AL COATED STEEL WIRE FOR BRIDGES WITH EXCELLENT CORROSION RESISTANCE AND FATIGUE PROPERTIES AND METHOD FOR MANUFACTURING THE SAME

(75) Inventors: Nobuyuki Shimoda, Tokyo (JP); Toshimi Tarui, Tokyo (JP); Junichi Kodama, Tokyo (JP); Makoto Kosaka, Tokyo (JP); Shingo Yamasaki, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 14 days.

(21) Appl. No.: 13/261,050

(22) PCT Filed: Jun. 23, 2010

(86) PCT No.: PCT/JP2010/004176
§ 371 (c)(1),
(2), (4) Date: Nov. 28, 2011

(87) PCT Pub. No.: WO2010/150537
PCT Pub. Date: Dec. 29, 2010

(65) Prior Publication Data
US 2012/0070687 A1    Mar. 22, 2012

(30) Foreign Application Priority Data

Jun. 25, 2009 (JP) ................................. 2009-151303
Jun. 25, 2009 (JP) ................................. 2009-151304
Jun. 25, 2009 (JP) ................................. 2009-151438

(51) Int. Cl.
*B32B 15/01* (2006.01)
*C23C 2/02* (2006.01)
(Continued)

(52) U.S. Cl.
CPC .................. *C23C 2/02* (2013.01); *B32B 15/013* (2013.01); *C21D 1/20* (2013.01); *C21D 1/607* (2013.01);
(Continued)

(58) Field of Classification Search
CPC ............... Y10T 428/12458; Y10T 428/12493; Y10T 428/1266; C22C 2/00; C22C 38/00; C22C 38/02; C22C 38/06; C23C 2/04; C23C 28/21

See application file for complete search history.

(56) References Cited

U.S. PATENT DOCUMENTS

| 4,389,463 | A | * | 6/1983 | Smeggil et al. | 428/659 |
| 6,270,842 | B1 | * | 8/2001 | Uchida et al. | 427/310 |
| 2010/0239884 | A1 | * | 9/2010 | Manabe et al. | 428/659 |

FOREIGN PATENT DOCUMENTS

| EP | 0602265 | 6/1994 |
| JP | 05-106002 | 4/1993 |

(Continued)

OTHER PUBLICATIONS

English language translation of JP 2002-235159 A from Japan Patent Office AIPN Online Translation, accessed Aug. 14, 2013.*

(Continued)

*Primary Examiner* — Mark Ruthkosky
*Assistant Examiner* — Julia L Rummel
(74) *Attorney, Agent, or Firm* — Kenyon & Kenyon LLP

(57) ABSTRACT

Disclosed is a high-strength Zn—Al coated steel wire for bridges with excellent corrosion resistance and fatigue properties, the Zn—Al coated steel wire includes: a steel wire; and a Zn—Al coating having a coating body layer and an Fe—Al alloy layer formed in an interface between a surface layer of the steel wire and the coating body layer, wherein a chemical composition of a core material of the steel wire includes, by mass %: C: 0.70% to 1.2%; Si: 0.01% to 2.5%; Mn: 0.01% to 0.9%; P: limited to 0.02% or less; S: limited to 0.02% or less; N: limited to 0.01% or less; and the balance including Fe and unavoidable impurities, wherein wire-drawn pearlite is most abundant microstructure among microstructures of the core material of the steel wire; wherein an average composition of the Zn—Al coating includes, by mass %, Al: 3.0 to 15.0%; and Fe: limited to 3.0% or less, and wherein the Fe—Al alloy layer has a thickness of 5 μm or less.

12 Claims, 3 Drawing Sheets

(51) Int. Cl.
| | |
|---|---|
| C21D 1/20 | (2006.01) |
| C21D 1/607 | (2006.01) |
| C21D 9/52 | (2006.01) |
| C22C 18/04 | (2006.01) |
| C22C 38/00 | (2006.01) |
| C22C 38/02 | (2006.01) |
| C22C 38/04 | (2006.01) |
| C22C 38/06 | (2006.01) |
| C22C 38/18 | (2006.01) |
| C23C 2/06 | (2006.01) |
| C23C 2/38 | (2006.01) |
| C23C 28/02 | (2006.01) |

(52) U.S. Cl.
CPC ............... *C21D 9/525* (2013.01); *C22C 18/04* (2013.01); *C22C 38/001* (2013.01); *C22C 38/02* (2013.01); *C22C 38/04* (2013.01); *C22C 38/06* (2013.01); *C22C 38/18* (2013.01); *C23C 2/06* (2013.01); *C23C 2/38* (2013.01); *C23C 28/021* (2013.01); *C21D 2211/009* (2013.01); *Y10T 428/1266* (2015.01); *Y10T 428/12799* (2015.01)

(56) References Cited

FOREIGN PATENT DOCUMENTS

| | | |
|---|---|---|
| JP | 05-156418 | 6/1993 |
| JP | 06-235054 | 8/1994 |
| JP | 07-018590 | 1/1995 |
| JP | 08-053737 | 2/1996 |
| JP | 08-053743 | 2/1996 |
| JP | 08-053779 | 2/1996 |
| JP | 2002-235159 | 8/2002 |
| JP | 2002-371343 | 12/2002 |
| JP | 2003-129205 | 5/2003 |
| JP | 2003-155549 | 5/2003 |
| JP | 2007-039799 | 2/2007 |
| JP | 2008-169478 | 7/2008 |
| WO | WO 2008/093466 | 8/2008 |

OTHER PUBLICATIONS

English language translation of JP 2008-169478 A from Japan Patent Office AIPN Online Translation, accessed Aug. 14, 2013.*

English language translation of JP 06-235054 A from Japan Patent Office AIPN Online Translation, accessed Aug. 14, 2013.*

International Search Report dated Jul. 27, 2010 issued in corresponding PCT Application No. PCT/JP2010/004176.

* cited by examiner

PRIOR ART

PRIOR ART

HIGH-STRENGTH ZN—AL COATED STEEL WIRE FOR BRIDGES WITH EXCELLENT CORROSION RESISTANCE AND FATIGUE PROPERTIES AND METHOD FOR MANUFACTURING THE SAME

This application is a national stage application of International Application No. PCT/JP2010/004176, filed 23 Jun. 2010, which claims priority to Japanese Application Nos. 2009-151303, filed 25 Jun. 2009; 2009-151304, filed 25 Jun. 2009; and 2009-151438 filed 25 Jun. 2009, each of which is incorporated by reference in its entirety.

TECHNICAL FIELD

The present invention relates to a high-strength Zn—Al coated steel wire suitable for main cables of suspension bridges, cable-stayed bridges and the like, a method for manufacturing the same, and wire rod for the high-strength Zn—Al coated steel wire for bridges.

This application claims the priority based on Japanese Patent Application Nos. 2009-151303 filed on Jun. 25, 2009, 2009-151304 filed on Jun. 25, 2009, and 2009-151438 filed on Jun. 25, 2009, the contents of which are incorporated herein by reference.

RELATED ART

Steel wire for bridges used for suspension bridges, cable-stayed bridges and the like are manufactured by patenting hot-rolled wire rod, followed by wire-drawing and surface-treating such as galvanizing. Here, patenting is a heat treatment to secure the strength of the steel wire and improve the cold workability of wire-drawing. Such patenting may be carried out by holding the wire rod under an environment of air (Stelmor method), or in molten salt or boiling water, or by re-heating the wire rod, followed by immersing it in molten Pb bath or the like. After the patenting, the strength of the steel wire is controlled by cold-drawing, and the steel wire is then surface-treated to improve the corrosion resistance thereof.

The surface-treatment generally performed to improve the corrosion resistance of steel wire is galvanizing. However, suspension bridges and cable-stayed bridges are supposed to be used for a long-term of 100 years or longer. Improving the corrosion resistance of steel wire for bridges is an important concern. For this reason, the steel wires treated with hot-dip Zn—Al coating which have excellent corrosion resistance, instead of the galvanizing, are suggested (for example, see Patent Documents 1 to 3).

However, it is difficult to treat the steel wire with the hot-dip Zn—Al alloy coating by using the same process as the conventional galvanizing. The cause is that an ammonium chloride flux used for manufacturing galvanized steel wire is decomposed in the molten Zn—Al bath containing Al. For example, when a hot-dip Zn—Al coated steel wire is manufactured by a flux method using ammonium chloride, defects such as non-coating may occur.

In an attempt to solve this problem, a manufacturing method, so-called, "2-bath method" in which the steel wire is subjected to galvanizing and is then subjected to hot-dip Zn—Al coating, was suggested (for example, see Patent Documents 4 and 5). However, such a 2-bath method is disadvantageous in terms of the necessity of preparing two types of molten coating baths, an increase in required processing and an increase in manufacturing costs.

In addition, in the 2-bath method, a Fe—Zn alloy layer formed in the interface between the coating and the steel substrate grows further when the galvanized steel wire is immersed in molten Zn—Al bath at about 450° C., and then the alloy layer thickens, which causes a deterioration in fatigue properties and workability. To solve this problem, a method for inhibiting growth of the Fe—Zn alloy layer by electroplating steel wire with Zn and then subjecting the same to hot-dip Zn—Al coating was suggested (for example, see Patent Document 6). However, this method also is disadvantageous in terms of an increase in required processing and an increase in manufacturing costs.

Also, in the 2-bath method, steel wire is immersed twice in molten coating baths at about 450° C. and the strength of the coated steel wire may thus decrease. To prevent this problem, a method was suggested, in which after galvanizing, wire-drawing is performed, which is followed by hot-dip Zn—Al coating (for example, see Patent Document 7). However, this method also involves an increase in the overall processing and cannot avoid growth of the alloy layer formed in the interface between the coating and the steel substrate.

PATENT DOCUMENTS

[Patent Document 1] Japanese Unexamined Patent Application, First Publication No. 5-156418
[Patent Document 2] Japanese Unexamined Patent Application, First Publication No. 7-18590
[Patent Document 3] Japanese Unexamined Patent Application, First Publication No. 6-235054
[Patent Document 4] Japanese Unexamined Patent Application, First Publication No. 2002-371343
[Patent Document 5] Japanese Unexamined Patent Application, First Publication No. 2003-129205
[Patent Document 6] Japanese Unexamined Patent Application, First Publication No. 2003-155549
[Patent Document 7] Japanese Unexamined Patent Application, First Publication No. H8-53779

SUMMARY OF THE INVENTION

Problems to be Solved by the Invention

According to the research results of the inventors of the present invention, in conventional suspension bridges, breakages in steel wire for bridges due to corrosion fatigue fracture have been found. Accordingly, in order to improve safeness of the steel wire for bridges, technologies to improve corrosion resistance and prevent the corrosion fatigue fracture should be developed urgently.

In accordance with one embodiment of the present invention, provided is a Zn—Al coated steel wire for bridges which can solve the problem of the Zn—Al coated steel wire with excellent corrosion resistance manufactured by a 1-bath method, refine the Al-rich phase (Al-rich primary phase) of a coating layer, inhibit growth of an alloy layer in the interface between the coating layer and the steel wire, and thus exhibit a corrosion resistance and fatigue properties considerably higher than conventional Zn—Al coated steel wire. More specifically, in one embodiment of the present invention, provided is a high-strength Zn—Al coated steel wire with excellent corrosion resistance and fatigue properties, for bridges such as suspension bridges and cable-stayed bridges, which has a wire diameter of 4 mm to 8 mm, a tensile strength of 1500 MPa to 1800 MPa, over 1800 MPa to 2000 MPa, or over 2000 MPa, and has a steel wire surface coated with Zn—Al. According to other embodiments of the present invention, provided are a method for manufacturing the coated steel wire and the wire rod used for manufacturing the coated steel wire.

Means for Solving the Problem

In the present invention, a high-strength steel wire is coated with Zn—Al by a single process using a flux, that is, the present invention relates to a high-strength, improved fatigue-strength Zn—Al steel wire, which is coated with a Zn—Al coating having an excellent corrosion resistance by a 1-bath method. The inventors of the present invention discovered that, for the coated steel wire, the microstructure of the coating layer of Zn—Al coating and the condition of the alloy layer formed in the interface between the coating layer and the steel wire are important to satisfy both the corrosion resistance and the fatigue properties. Also, the inventors discovered that, for example, optimally controlling the microstructure of the wire rod as raw materials is important in order to prevent a decrease in ductility due to high-strengthening of the coated steel wire. The present invention has been completed based on these discoveries.

The features of the present invention are as follows.

(1) According to one embodiment of the present invention, provided is a high-strength Zn—Al coated steel wire for bridges with excellent corrosion resistance and fatigue properties, the Zn—Al coated steel wire including: a steel wire; and a Zn—Al coating having a coating body layer and an Fe—Al alloy layer formed in an interface between a surface layer of the steel wire and the coating body layer, wherein a chemical composition of a core material of the steel wire includes, by mass %: C: 0.70% to 1.2%; Si: 0.01% to 2.5%; Mn: 0.01% to 0.9%; P: limited to 0.02% or less; S: limited to 0.02% or less; N: limited to 0.01% or less; and the balance including Fe and unavoidable impurities, wherein wire-drawn pearlite is most abundant microstructure among microstructures of the core material of the steel wire; wherein an average composition of the Zn—Al coating includes, by mass %, Al: 3.0 to 15.0%; and Fe: limited to 3.0% or less, and wherein the Fe—Al alloy layer has a thickness of 5 µm or less.

(2) As to the coated steel wire according to (1), a primary phase of the coating body layer may have a diameter of 10 µm or less, and wherein the wire-drawn pearlite may include 90% or more of the microstructure of the core material of the steel wire.

(3) As to the coated steel wire according to (1) or (2), an $Al_{3.2}Fe$ columnar grain layer and an $Al_5Fe_2$ columnar grain layer may be most abundant microstructure among microstructures of the Fe—Al alloy layer.

(4) As to the coated steel wire according to (1) or (2), the average composition of the Zn—Al coating may further include, by mass %, Si: 0.01% to 2.0%.

(5) As to the coated steel wire according to (4), $Al_{3.2}Fe$ and $Al_5Fe_2$ columnar grain layers, and an Fe—Al—Si granular grain layer may be most abundant microstructures among a microstructure of the Fe—Al alloy layer.

(6) As to the coated steel wire according to any one of (1) to (5), the average composition of the Zn—Al coating may include, by mass %, Al: 6.0 to 15.0%.

(7) As to the coated steel wire according to any one of (1) to (6), the chemical composition of the core material of the steel wire may further include at least one of, by mass %, Cr: 0% to 0.5%, Ni: 0% to 1.0%, Cu: 0% to 0.5%, Mo: 0% to 0.5%, V: 0% to 0.5%, and B: 0% to 0.0070%.

(8) As to the coated steel wire according to any one of (1) to (7), the chemical composition of the core material of the steel wire may further include at least one of, by mass %, Al: 0% to 0.1%, Ti: 0% to 0.1%, Nb: 0% to 0.05%, and Zr: 0% to 0.1%.

(9) As to the coated steel wire according to any one of (1) to (8), a torsion number before fracture during a torsion test may be at least 18 times.

(10) As to the coated steel wire according to any one of (1) to (9), a ratio of fatigue limit under partial pulsating tension to tensile strength may be 0.22 or higher.

(11) According to another embodiment of the present invention, provided is a method for preparing a Zn—Al coated steel wire according to any one of (1) to (10), the method includes: wire-drawing the steel wire at a temperature of 250° C. or less; pickling the steel wire with acid; treating the steel wire with a flux; and coating the flux-treated steel wire with Zn—Al, wherein the coating with Zn—Al is the only coating process included in the method for manufacturing the coated steel wire.

(12) As to the method according to (11), the coating with Zn—Al may be carried out by immersing the wire-drawn steel wire in molten Zn—Al bath containing, by mass %, Al: 3.0% to 15.0%.

(13) As to the method according to (11), the method may further include: hot-rolling the steel material; and patenting the steel material by immersion in salt bath at 500° C. to 600° C. after the hot-rolling process.

(14) As to the method according to any one of (11) to (13), the molten Zn—Al bath may further contain, by mass %, Si: 2.0% or less, and the Zn—Al coated steel wire according to any one of claims 4, 5 and 7 to 10 is manufactured.

(15) As to the method according to any one of (11) to (13), the molten Zn—Al bath may further contain, by mass %, Al: 6.0% to 15%, and the Zn—Al coated steel wire according to any one of claims 6 to 10 is manufactured.

(16) As to the method according to any one of (11) to (15), the method may further include, after the wire-drawing, at least one of: roller-straightening; and heating the steel wire at 400° C. to 500° C. for 1 sec to 60 sec.

Advantageous Effects of Invention

According to the present invention, high-strength Zn—Al coated steel wire for bridges with excellent corrosion resistance and fatigue properties can be efficiently provided, and, at the same time, remarkable industrial contribution can be realized, for example, prolongment of lifetime can be imparted to the steel wires for bridges.

DESCRIPTION OF EMBODIMENTS

Figure 1A:
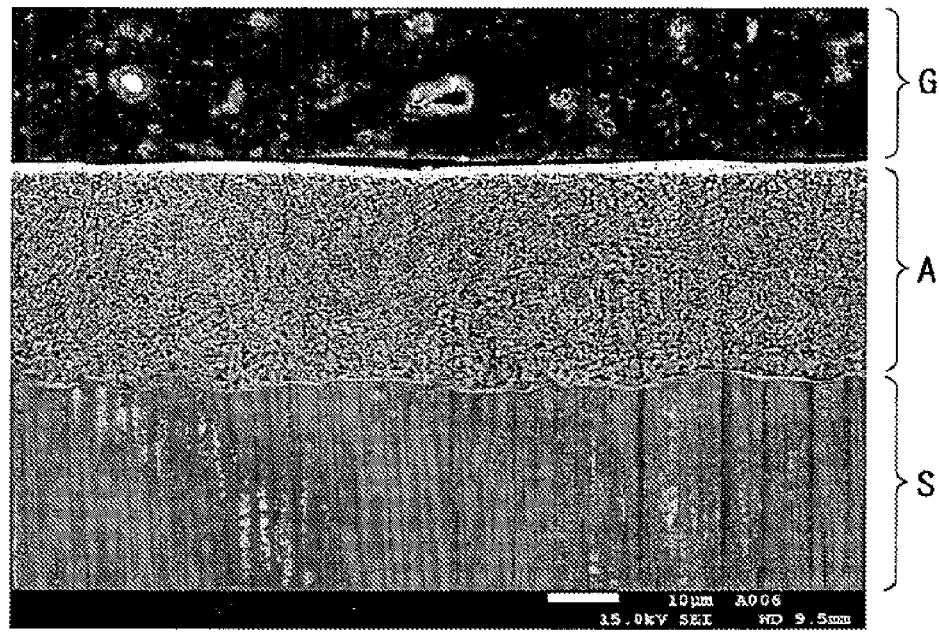
FIG. 1A shows a microstructure of a coating layer of a coated steel wire manufactured by a 2-bath alloy coating method according to conventional art.

Hereinafter, the present invention will be described in detail. Unless specifically mentioned otherwise, "%" of the composition used in this specification means % by mass.

Also, in this specification, coated steel wire is classified into "1500 MPa class" including coated steel wire having a tensile strength ranging from 1500 MPa to 1800 MPa, "1800 MPa class" including coated steel wire having a tensile strength ranging from 1800 MPa to 2000 MPa, and "2000 MPa class" including coated steel wire having a tensile strength over 2000 MPa.

C: C is an element which is effective in increasing the tensile strength after patenting and improving work hardening rate during wire-drawing. The addition of C is able to let the strength of the steel wire increase even with a small strain applied during wire-drawing, and also contributes to improvement in the fatigue properties.

In one embodiment of the invention, the amount of carbon in the steel wire is limited to the range from 0.70% to 1.2%. In addition, for 1500 MPa class-coated steel wire, the amount of carbon may be further limited to the range from 0.70% to 0.95%. For 1800 MPa class-coated steel wire, the amount of carbon may be further limited to the range from 0.8% to 1.0%. For 2000 MPa class-coated steel wire, the amount of carbon may be further limited to the range from 0.9% to 1.2%.

When the amount of carbon in the coated steel wire is equal to or higher than the lower limit of the range as defined above, a sufficient tensile strength of the patented wire rod is obtained as long as other alloy elements are added, and the work hardening rate of wire-drawing is sufficiently high, thus the desired high-strength steel wire for bridges is obtained. On the other hand, when the amount of carbon is not higher than the upper limit of the range as defined above, the treatment costs to reduce center segregation are within an acceptable range.

Si: the steel wire according to one embodiment of the present invention limits the amount of Si to 0.01% to 2.5%. Also, for 1500 MPa class-coated steel wire, the amount of Si may be further limited to the range of 0.01% to 0.5%. For 1800 MPa class-coated steel wire, the amount of Si may be further limited to the range of 0.5% to 1.5%, more preferably, to the range of 0.7% to 1.5%. For 2000 MPa class-coated steel wire, the amount of Si may be further limited to the range of over 0.8% to 2.5%. Si is a deoxidizing agent and is an element which effectively strengthens ferrite in pearlite, and is thus added in an amount equal to or higher than the lower limit of the range defined above. On the other hand, even if silicon is added in an amount exceeding the upper limit of the range, the above-mentioned effects are saturated.

Si is effective in preventing a decrease in the strength of the steel wire during heating in molten coating bath and is thus more preferably added in an amount of 0.1% or higher.

Mn: the steel wire according to one embodiment of the present invention limits the amount of Mn to 0.01% to 0.9%. Also, for 1500 MPa class-coated steel wire, the amount of Mn may be further limited to the range of 0.01% to 1.5%. For 1800 MPa class-coated steel wire, the amount of Mn may be further limited to the range of 0.1% to 1.2%. For 2000 MPa class-coated steel wire, the amount of Mn may be further limited to the range of 0.1% to 0.9%.

Mn is an element effective for deoxidation and desulfurization and is thus added in an amount equal to or larger than the lower limit of the range defined above. In order to improve hardenability of steel and thus increase the tensile strength after patenting, it is more preferable that Mn be added in an amount of 0.1% or higher. On the other hand, when the amount of Mn is equal to or lower than the upper limit of the range, degree of segregation does not increase and transformation to bainite, which reduces torsion number upon patenting, is prevented. Also, in order to improve hardenability and thus reduce the added amounts of other alloy components, it is more preferable that, for 1500 MPa and 1800 MPa classes, 0.3% or higher of Mn may be added, and, for 2000 MPa class, 0.2% or higher of Mn may be added.

P: P is an impurity and is thus limited to 0.02% or less to inhibit a deterioration in the ductility. Also, the upper limit of P may be preferably 0.01% or less.

S: S is an impurity and is thus limited to 0.02% or less to inhibit a deterioration in hot workability. Also, the upper limit of the amount of S may be preferably 0.01% or less.

N: N is an impurity and deteriorates the ductility, when added in an excessive amount, and is thus limited to 0.01% or less. In addition, the upper limit of N may be preferably 0.007% or less. Also, in order to refine the grain size using nitride of an element such as Al, Ti, Nb or Zr, the amount of N may be preferably 0.001% or higher.

Although the basic elements have been described above, the steel wire of the present invention may further contain at least one of Cr, Ni, Cu, Mo, V and B in order to improve the strength after patenting.

Cr: Cr is an element effective for refining lamellar spacing of pearlite, improving the tensile strength after patenting and thus increasing work hardening rate of wire-drawing. However, when Cr is added in an amount over 0.5%, the ductility may decrease due to improvement in the strength. Accordingly, the upper limit of Cr may be preferably 0.5% or less. Also, 0.01% or higher of Cr may be preferably added in order to improve the fatigue properties and prevent a deterioration in the strength upon hot-dip coating.

Ni: Ni is an element effective for improving hardenability, refining lamellar spacing upon patenting and improving the strength after patenting. However, even if Ni is added in an amount over 1.0%, the above-mentioned effects are saturated. Accordingly, the upper limit of Ni may be preferably 1.0% or less. Also, Ni can effectively improve the drawability of pearlite and may be thus preferably added in an amount of 0.01% or higher.

Cu: Similar to Ni, Cu is an element effective for refining lamellar spacing upon patenting and improving the strength after patenting. Cu may be preferably added in an amount of 0.01% or higher in order to obtain pearlite with superior drawability. However, even if Cu is added in an amount over 0.5%, the above-mentioned effects are saturated. Accordingly, the upper limit of Cu may be preferably 0.5% or less.

Mo: Mo is also an element to improve hardenability. The addition of Mo enables the tensile strength to be efficiently improved after patenting. Mo may be preferably added in an amount of 0.01% or higher. On the other hand, even if Mo is added in an amount over 0.5%, the effects are saturated. Accordingly, the upper limit of Mo may be preferably 0.5% or less.

V: V is an element to increase the tensile strength after patenting by precipitation strengthening. Also, addition of V advantageously inhibits a decrease in the strength during hot-dip coating. Accordingly, V may be preferably added in an amount of 0.01% or higher. On the other hand, when V is added in an amount over 0.5%, the ductility may decrease. Accordingly, the upper limit may be preferably 0.5% or less.

B: B is an element to increase the tensile strength after patenting by an improvement in hardenability. In order to improve hardenability, B may be preferably added in an amount of 0.0001% or higher. On the other hand, even if B is added in an amount over 0.0070%, the effects comparable to the added amount cannot be realized. Accordingly, the upper limit of B may be preferably 0.0070% or less.

The steel wire of the present invention may further contain at least one of Al, Ti, Nb and Zr in order to improve the strength, to refine a grain size, in particular, to refine the grain size of prior-austenite, and thus to improve cold drawability.

Al: Al is an element which is effective for deoxidation and contributes to prevention of coarsening of grains. However, even if Al is added in an amount over 0.1%, the effects are saturated. Accordingly, the upper limit of Al may be preferably 0.1% or less. Also, Al may be preferably added in an amount of 0.001% or higher in order to refine the grain size of prior-austenite and thus improve the drawability of the steel wire after pearlite transformation.

Ti: Ti is an element effective for deoxidation and contributes to improvement in the strength by formation of carbides or nitrides and prevention of grain coarsening. 0.001% or higher of Ti may be preferably added in order to refine prior-austenite grain size and improve the drawability of the steel wire after pearlite transformation and thus improve the ductility of the steel wire. On the other hand, when Ti is added in an amount over 0.1%, carbonitride of Ti coarsens, thus causing a deterioration in the drawability or the fatigue properties. Accordingly, the upper limit of Ti may be thus preferably 0.1% or less.

Nb: Similar to Ti, Nb is an element to form carbides and nitrides. Nb is effective element for refining a grain size of austenite by the carbides and nitrides. In particular, 0.001% or higher of Nb may be preferably added in order to refine the grain size of prior-austenite, improve the drawability of the steel wire after pearlite transformation and thus improve the ductility of the steel wire. On the other hand, even if Nb is added in an amount over 0.05%, the effects are saturated. Accordingly, the upper limit of the amount of Nb may be preferably 0.05% or less.

Zr: Similar to Ti and Nb, Zr is also an element that forms carbides and nitrides. In order to improve the drawability of the steel wire after pearlite transformation and thus improves the ductility of the steel wire, 0.001% or higher of Zr may be preferably added. On the other hand, even if Zr is added in an amount over 0.1%, the effects are saturated. Accordingly, the upper limit may be preferably 0.1% or less.

As for the microstructure of the Zn—Al coated steel wire with excellent corrosion resistance and fatigue properties according to one embodiment of the present invention, a wire-drawn pearlite is the most abundant of all the other microstructure such as ferrite and bainite. The microstructure composed of wire-drawn pearlite only is more preferable. In this document, the term "wire-drawn pearlite" refers to a lamellae structure which does not contain coarse one obtained in wire-drawing. The wire-drawn pearlite which does not include coarse pearlite is preferable. Also, the term "microstructure that is substantially composed of the wire-drawn pearlite" refers to a microstructure in which microstructure except for pearlite cannot be observed with optical microscopes. Also, for the microstructure substantially composed of the wire-drawn pearlite, the microstructure except for pearlite may be confirmed with an apparatus such as a scanning electron microscope (SEM).

When a fraction of non-pearlite such as ferrite or bainite increases, the fatigue properties and the ductility may deteriorate. For this reason, it is preferable to secure a sufficient fraction of wire-drawn pearlite. For the 1500 MPa class, the wire-drawn pearlite fraction is preferably 90% or higher (this fraction may be 100% or less). For the 1800 MPa and 2000 MPa classes, the wire-drawn pearlite is preferably 92% or higher. For all the classes, it is more preferable that the wire-drawn pearlite fraction is 95% or higher. The wire-drawn pearlite fraction greatly depends on salt bath temperature for patenting. For the 1500 MPa class, when the salt bath temperature is 500° C. or higher, it is possible to suitably avoid transforming to bainite. For 1800 MPa and 2000 MPa classes, the salt bath temperature is preferably 520° C. or higher. For all the classes, the salt bath temperature is controlled to 600° C. to obtain fine pearlite. Also, when the cooling rate after hot-rolling is excessively low, the amount of coarse lamellae increases. For this reason, the cooling rate is preferably 10° C./s or higher.

In the present invention, for determination of the wire-drawn pearlite fraction, the microstructure is observed with SEM at a magnification of 5,000-fold, micrographs are taken about 10 visual fields, an area fraction of the wire-drawn pearlite is measured by using an image analyzer, and the average of the area fraction is calculated. The measurement of the wire-drawn pearlite fraction is carried out at the position of d/4 from the surface layer of the steel wire, where d is the diameter of the steel wire.

Next, the functions and contents of alloy elements of Zn—Al coating will be described. The Zn—Al coating (Zn—Al coating layer) according to one embodiment of the present invention consists of a coating layer (coating body layer; Zn—Al alloy layer) composed of an alloy based on Zn—Al as a main material and an alloy layer (Fe—Al alloy layer) composed of an intermetallic compound based on Fe—Al as a main material. The Fe—Al alloy layer is formed in the interface between the steel substrate (the steel wire) of the Zn—Al coated steel wire and the coating body layer during processing. That is, the Fe—Al alloy layer is formed, which directly connects to both the steel wire and the coating body layer. In other words, for the coated steel wire according to one embodiment of the present invention, the Fe—Al alloy layer is the only layer interposed between the steel wire and the coating body layer, and other layers which have the size and thickness that may affect the corrosion resistance or the fatigue properties of the coated steel wire are not substantially included. In the aforementioned sense, the Zn—Al coated steel wire according to one embodiment of the present invention consists of a steel wire, a coating body layer, and a Fe—Al alloy layer formed between the steel wire and the coating body layer. Also, the composition of the Zn—Al coating defined as described below include a component of the coating layer (coating body layer) and of the alloy layer (Fe—Al alloy layer).

Aluminum (Al) is an element which improves the corrosion resistance, rather than having an effect of sacrificial protection like Zn, but by forming a dense oxide thin film on the coating surface. Addition of 3% or higher of Al is required to improve the corrosion resistance of Zn—Al coating. Also, it is preferable to add 6% or higher of Al to the Zn—Al coating, which correspond to the eutectic point of Zn—Al. In a Zn—Al coating containing 6% or higher of Al, an Al-rich phase precipitates prior to a Zn-rich phase (that is, Al-rich primary phase is formed) upon solidification, which forms a dense oxide thin film and prevents the corrosion of the surface. Therefore, the corrosion resistance is considerably improved. Also, it is preferable that the amount of Al in the Zn—Al coating be 8% or higher, in order to increase the Al-rich phase and thus improve the corrosion resistance.

Figure 2:
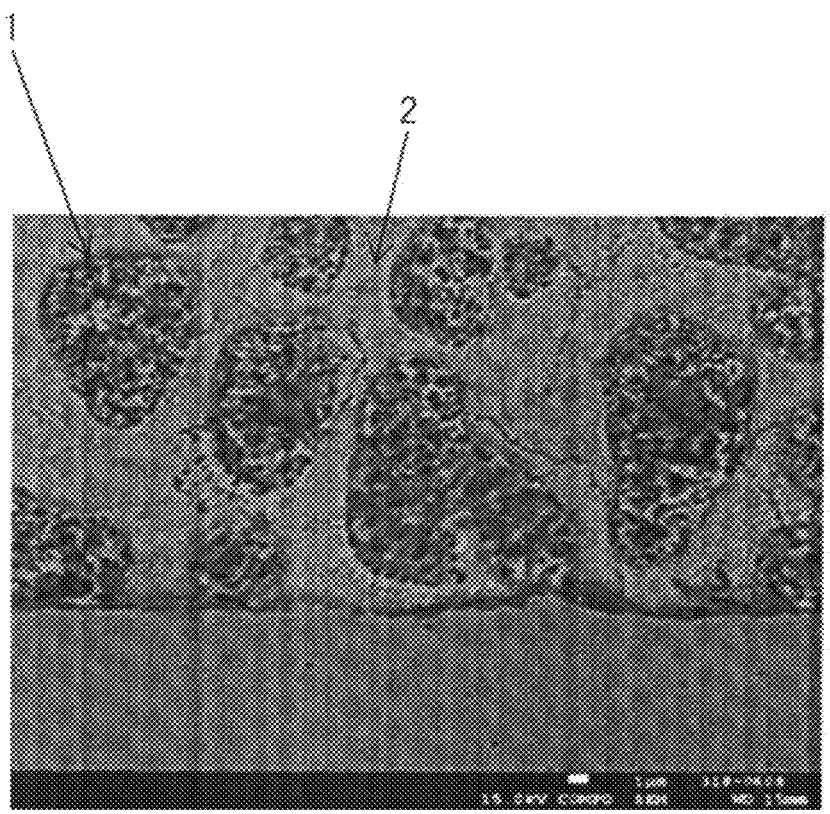
FIG. 2 shows a microstructure of a coating layer of a coated steel wire manufactured by a 1-bath alloy coating method according to an embodiment of the invention.

Also, the inventors of the present invention discovered that the Zn—Al alloy layer of the coating layer of the Zn—Al coated steel wire affects the workability and the fatigue properties. As shown in FIG. 2, the Zn—Al alloy layer of the coating layer includes an Al-rich primary phase 1 having a face-centered cubic structure (fcc) containing Al and Zn as main components and an eutectic phase 2 surrounding the primary phase and containing a relatively larger amount of Zn. The eutectic phase 2 includes eutectic structure of the hexagonal close-packed structure (hcp) of Zn and the face-centered cubic structure (fcc) of Al. The Al-rich primary phase 1 is an αAl phase (including an α1Al phase) which contains solid-solute Zn. The Zn-rich primary phase as mentioned below is a Zn phase which contains solid-solute Al. According to the investigations of the inventors of the present invention, when primary phase of the Zn—Al alloy layer, that is, the Al-rich primary phase or Zn-rich primary phase coarsen, cracks are initiated at the Zn—Al alloy layer along the boundary between the Al-rich phase and the Zn-rich phase when the bending is conducted for the coated steel wire. For this reason, it is preferable that the Al-rich phase has a fine structure (grain size).

When the amount of Al increases, the effect of improvement in the corrosion resistance increases. However, when the amount of Al exceeds 15%, the effects are saturated and the coating melting point increases, which is a disadvantage for the production. Accordingly, the upper limit of the amount of Al in the Zn—Al coating is limited to 15%. Also, the amount of Al in the Zn—Al coating may be controlled by the concentration of Al in the molten coating bath.

Iron (Fe) contained in the Zn—Al coating diffuses from the surface of the steel wire and forms an alloy layer (Fe—Al alloy layer) containing Fe and Al as main components in the interface between the coating and the steel substrate. Accordingly, the amount of Fe in the Zn—Al coating may be varied according to the thickness of the alloy layer (Fe—Al alloy layer). When the amount of Fe in the Zn—Al coating is over 3.0%, the alloy layer is excessively thick and the fatigue properties may readily become lower. Accordingly, to obtain a good balance adhesion between the coating and the steel substrate and the fatigue properties, the amount of Fe in the Zn—Al coating is limited to 3.0% or less. Also, thinner thickness of the alloy layer is preferable in order to improve the fatigue properties. Accordingly, it is more preferable that the amount of Fe in the Zn—Al coating is limited to a predetermined amount or less. For the 1500 MPa class, the amount of Fe is preferably limited to 3.0% or less. For 1800 MPa and 2000 MPa classes, the amount of Fe is preferably limited to 2.0% or less. On the other hand, when the alloy layer (Fe—Al alloy layer) is formed in the interface between the coating and the steel substrate, the coating is firmly adhered to the steel wire. Accordingly, it is preferable that 0.01% or higher of Fe is contained in the Zn—Al coating.

Preferably, the Zn—Al coating further contains Si. In addition, the amount of Si in the Zn—Al coating is controlled by the amount of Si in the molten Zn—Al bath.

Si is an element to inhibit growth of an alloy layer (Fe—Al alloy layer) formed in the interface between the steel wire and the coating. In order to inhibit local growth of the alloy layer formed in the interface between the coating and the steel substrate, it is preferable that the amount of Si in the Zn—Al coating is 0.05% or higher. On the other hand, when the amount of Si in the Zn—Al coating exceeds 2.0%, the effect of inhibiting an increase in thickness of alloy layer is saturated, the coating itself hardens, and the fatigue strength may be thus lower. Accordingly, preferably, the upper limit of the amount of Si in the Zn—Al coating is limited to 2.0% or less. In order to further improve the fatigue strength, it is preferable that the upper limit of the amount of Si in the Zn—Al coating is limited to 1.5% or less.

In addition, when the coating contains Si, the influence of the temperature of the molten coating bath or the cooling rate on growth of the alloy layer is reduced. Accordingly, it is preferable that the coating contains Si in order to inhibit growth of the alloy layer in the cases of a high molten coating bath temperature or a low cooling rate.

Also, the chemical components of the Zn—Al coating may be determined by immersing the Zn—Al coating in acid solution containing an acid-pickling corrosion inhibitor at room temperature for a few minutes for dissolving, and then subjecting the solution to inductively coupled plasma (ICP) emission spectroscopy or atomic absorption spectroscopy. Alternatively, the analysis may be carried out in accordance with a method disclosed in JIS H0401. For example, hexamethylenetetramine is dissolved in hydrochloric acid solution, the solution is diluted with water to prepare test solution, the coating is dissolved in the test solution, and the coating solution is chemically analyzed by ICP. In this method, the coating layer and the alloy layer (Fe—Al alloy layer) are dissolved. In addition, the chemical analysis may be carried out by using an exfoliated Zn—Al coating obtained by processing such as bending the coated steel wire to mechanically exfoliate the coating layer and the alloy layer from the steel wire.

For the chemical components contained in the Zn—Al coating, the remainder except Al, Si and Fe is Zn and unavoidable impurities. Herein, the unavoidable impurities means elements unavoidably incorporated through the processes of coating such as Mg, Cr, Pb, Sb, Sn, Cd, Ni, Mn, Cu or Ti. Also, the total amount of unavoidable impurities may be preferably 1% or less.

Next, the microstructure of the coating layer in the Zn—Al coating is described below.

The microstructure of the coating layer is solidification structure. When molten Zn—Al is cooled, in the case when the concentration of Al is lower than a eutectic point (6%), a primary phase Zn-rich layer (Zn-rich primary phase) precipitates first, and then an Al-rich phase of Zn—Al (eutectic) is formed which fills the space among the primary phase. On the other hand, in the case when the concentration of Al corresponds to the eutectic point or higher, the Al-rich primary phase precipitates first and then a Zn-rich phase (eutectic) is formed which fills the space among the primary phase.

When the first precipitated primary phase (Al-rich primary phase or Zn-rich primary phase) coarsens, the phase becomes an initiation point of cracking and exfoliation, which results in a decrease in the fatigue strength. Accordingly, the diameter of primary phase of the coating layer is limited to 10 μm or less, so as not to negatively affect the fatigue strength. Also, it is preferable that the diameter of primary phase is 5 μm or less in order to improve the fatigue strength. The refining of primary phase is carried out by lowering the temperature of molten coating baths, increasing a cooling rate after coating, and balancing these two methods. Accordingly, in order to control the diameter of primary phase to 10 μm or less, it is necessary to achieve balance between lowering the temperature of molten coating baths and increasing the cooling rate after coating, that is, increasing the cooling rate after the steel wire is drawn up from the molten coating bath. Also, the lower limit of the diameter of primary phase is preferably 1 μm or larger, in terms of operational restrictions such as the temperature of the molten coating bath and the cooling rate after coating.

The primary phase may take the form of a circle in some cases, but usually take the form of an ellipse in many cases. The diameter of ellipsoidal primary phase is determined from an average of a major diameter and a minor diameter. Alternatively, the diameter of primary phase may be determined as equivalent circle diameter obtained by image analysis of a SEM micrograph. Also, when the cooling rate after coating is high, the primary phase may take the form of dendrite. In this case, the diameter of primary phase is measured as the width of the dendrite. The measurement of diameter of primary phase may be carried out by using SEM. In the present invention, the diameter of primary phase is obtained by taking micrographs of 10 visual fields or more at a magnification of 2,000-fold, measuring the diameter, and calculating the average thereof.

Next, the alloy layer (Fe—Al alloy layer) formed in the interface between the coating layer of the Zn—Al coating and the steel substrate is described below.

When the alloy layer (Fe—Al alloy layer) formed in the interface between the coating layer of Zn—Al coating and the steel substrate has a thickness over 5 μm, the fatigue properties of the Zn—Al coated steel wire deteriorate. Accordingly, the upper limit of the diameter is limited to 5 μm. More preferably, the thickness of the alloy layer is 3 μm or less. The lower limit of the thickness of the alloy layer is substantially 10 nm. On the other hand, in order to improve the adhesion between the Zn—Al coating and the steel wire, it is preferable that the lower limit of the thickness of the alloy layer is 0.05 μm or larger. Controlling the thickness of the alloy layer to 5 μm or less may be carried out by increasing the amount of Si in the coating layer, lowering the temperature of the molten coating bath, shortening an immersion time of the steel wire to be coated, increasing a cooling rate after coating, and combining thereof suitably, as specifically described below in Examples. For example, even if the temperature of the molten coating bath is high or the cooling rate is low, by increasing the Si content, the thickness of the alloy layer can be controlled to 5 μm or less.

In the present invention, the thickness of alloy layer (Fe—Al alloy layer) is measured by using a transmission electron microscope (TEM). TEM observation is performed at a magnification of 5,000-fold to 20,000-fold according to the thickness of the alloy layer, micrographs of 10 different visual fields or more are taken according to the magnification, and the average of the thickness of the alloy layer is calculated. In addition, the presence of the alloy layer in the interface between the coating layer and the steel substrate wire may be confirmed by TEM observation and energy-dispersive X-ray spectroscopy (EDS). The alloy layer may also be confirmed by high-resolution field-emission scanning electron microscopy (FE-SEM) and EDS.

Figure 1B:
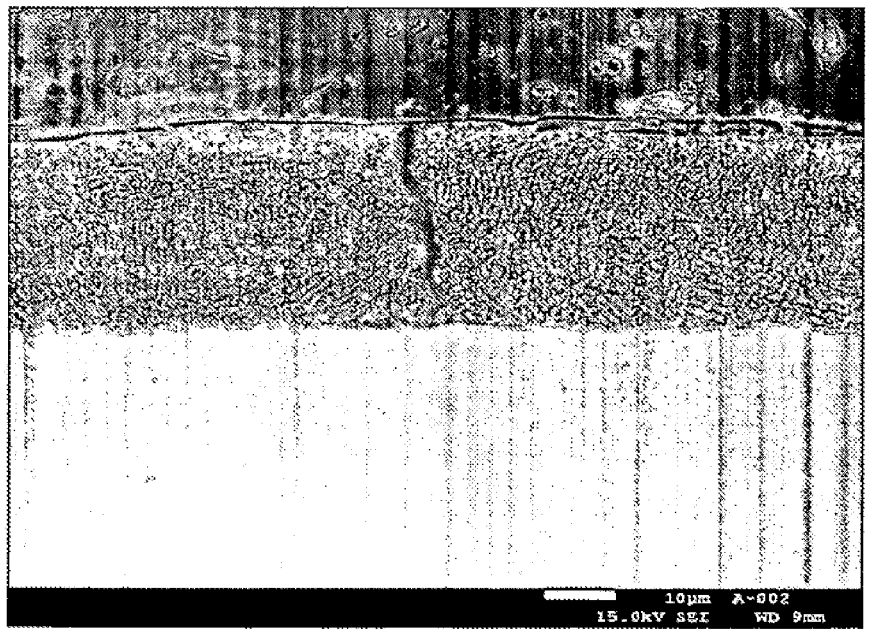
FIG. 1B shows a crack formed in the coating layer of FIG. 1A.
Figure 1C:
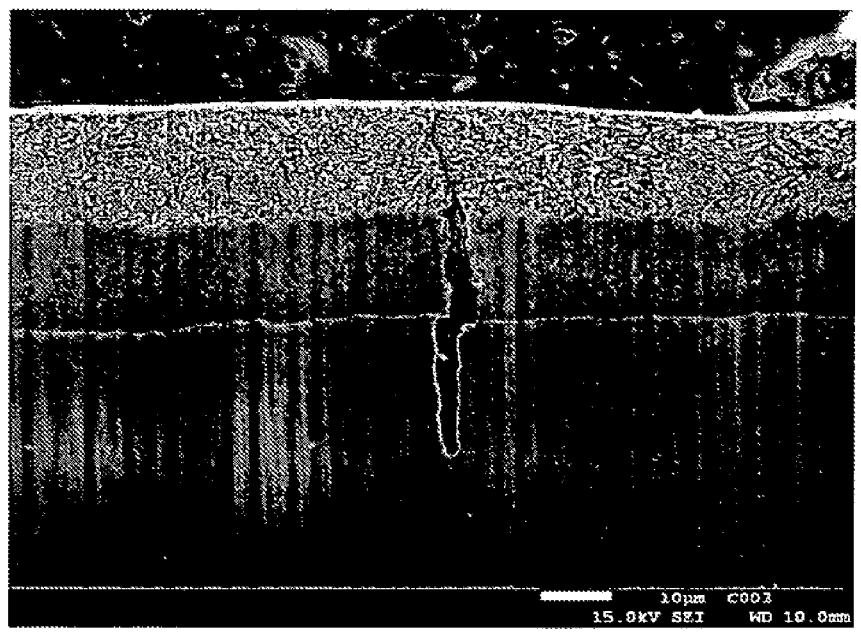
FIG. 1C shows a crack formed in the coating layer of FIG. 1A.

In a 2-bath Zn—Al alloy coating method which is a conventional technique, a first bathing uses molten Zn bath, and a second bathing uses molten 10% Al—Zn bath. As a result, a Fe—Zn—Al alloy layer A is formed in the interface between a coating region G and base steel S (FIG. 1A). A crack of fatigue fracture may be initiated at the Fe—Zn—Al alloy layer due to relatively high hardness of the layer (FIG. 1B). Stress is concentrated at the crack initiated in the Fe—Zn—Al alloy layer A and the crack may further propagate to the base steel layer S of the steel wire in some cases (FIG. 1C).

On the other hand, the alloy portion of the alloy layer (Fe—Al alloy layer) according to one embodiment of the present invention, as described in detail below, does not substantially contain Zn, that is, Zn-less alloy or low Zn alloy (Al—Fe columnar grain). Even if a small amount of residual Zn exists around the alloy layer, Zn exists independently in gaps between the columnar grains of Al—Fe alloy. Accordingly, the alloy portion in the alloy layer is an alloy substantially composed of Al and Fe. The Fe—Al alloy layer exhibits excellent fatigue properties as compared to the Fe—Zn—Al alloy layer A, thus the fatigue fracture is hard to occur.

The alloy portion of alloy layer consists of an $Al_{3.2}Fe$ columnar grain layer and an $Al_5Fe_2$ columnar grain layer, when the Zn—Al coating does not contain Si. That is, the two types of columnar grains are the most abundant in the microstructure of the alloy layer. That is, the alloy layer has a multiple-layer structure in which a layer (lower layer) provided at the side of the steel wire is $Al_5Fe_2$ containing a greater amount of Fe and with a greater alloying degree, and a layer (upper layer) provided at the side of the coating layer is $Al_{3.2}Fe$ with a lower alloying degree. It is considered that the formation of such a multiple-layer structure decreases internal stress of the layers and stress difference in the interface between the lower and upper layers. Therefore, the adhesion of the coating is further improved.

On the other hand, when the Zn—Al coating contains Si, a layer composed of Al—Fe—Si granular grains (referred to as "granular grain layer") is formed between the aforementioned alloy layer (referred to as "columnar grain layer") and the coating layer, wherein the alloy layer consists of the $Al_{3.2}Fe$ columnar grain layer and the $Al_5Fe_2$ columnar grain layer. Accordingly, for the Zn—Al coating containing Si, it seems that the granular grain layer inhibits diffusion of Fe from the steel wire to the Zn—Al coating and growth of columnar grain layer. Also, it is considered that the granular grain layer reduces stress difference in the interface between the columnar grain layer and the coating layer, which results in superior adhesion.

In particular, the temperature of the molten coating bath or cooling rate has a small influence on formation of the granular grain layer resulted from addition of Si. Although the reason is not clear, formation of granular grains resulted from addition of Si is effective in inhibiting growth of the alloy layer, even when the temperature of the molten coating bath or cooling rate is varied. Also, it seems that the granular grain layer reduces stress difference in the interface between the columnar grain layer and the coating layer, which results in further superior adhesion.

In addition, the microstructure of $Al_5Fe_2$ columnar grains, $Al_{3.2}Fe$ columnar grains and Al—Fe—Si granular grains can be observed with TEM, and crystal structure thereof can be specified and identified by electron beam diffraction. Also, fine granular phase consisted of Zn or Zn—Al may exist in the alloy layer. The Zn or Zn—Al phase is located at grain boundaries of $Al_{3.2}Fe$ columnar grains, grain boundaries of $Al_5Fe_2$ columnar grains, the interface between the upper layer and lower layer of columnar grain layers, and the interface between the columnar grain layer and the granular grain layer.

Next, the characteristics of the Zn—Al coated steel wire according to the present invention are described below.

Torsion number: torsion number is a number at which a material is fractured by twist of a torsion test, which is an indicator of the ductility of the steel wire. The present inventors first demonstrated that, when the torsion number is 18 times or more, the ductility of the Zn—Al coated steel wire is high and the fatigue properties, in particular, the corrosion fatigue properties are considerably improved. Accordingly, it is preferable that the torsion test is carried out for 50 test specimens, desirably 100 test specimens, the torsion number of the entire test specimens is 18 times or more, that is, the minimum of the torsion number is at least 18.

The torsion test is carried out by using test specimens in which a gauge length between grips can be set to 100 times of the wire diameter. Both ends of test specimens sampled from the Zn—Al coated steel wire are griped with a distance between the grips of 100 times of the wire diameter. And one end of a specimen is rotated in one direction, while the test specimen is given with a tension in order not to warp. The torsion test is carried out at a torsion rate of 10 rotations per minute (rpm) and the number at which the test specimen is fractured is evaluated as the torsion number. Also, the torsion test is carried out by using 50 test specimens, desirably 100 test specimens serially sampled from the manufactured Zn—Al coated steel wire.

Fatigue limit: a ratio of the fatigue limit to the tensile strength is preferably 0.22 or higher. The reason is that, as the tensile strength of the coated steel wire increases, design stress increases. When the ratio of the fatigue limit to the tensile strength surpasses 0.22, an advantage of improving the fatigue strength is sufficient, namely a longer lifespan of bridges can be obtained. In order to further improve durability of bridges, the ratio of the fatigue limit to the tensile strength is more preferably 0.25 or higher.

In the present invention, the fatigue properties of the Zn—Al coated steel wire are evaluated by a partially pulsating tensile fatigue test. The fatigue limit (maximum stress minus minimum stress) which is evaluated at the repeating cycles of $2 \times 10^6$ is obtained by varying maximum stress with a fixed minimum stress according to the tensile strength of the coated steel wire. The minimum stress is varied according to the tensile strength thereof, wherein 490 MPa for 1500 MPa steel wire is used as a standard. For example, for 1600 MPa steel wire, the minimum stress is 523 MPa which is calculated by the equation of 490×1600/1500. Also, for example, for 1800 MPa steel wire, the minimum stress is 588 MPa which is calculated by the equation of 490×1800/1500. Also, for example, for 2100 MPa steel wire, the minimum stress is 686 MPa which is calculated by the equation of 490×2100/1500.

Next, wire rod used for manufacturing the high-strength Zn—Al coated steel wire with excellent fatigue properties is described below. Here, the term "wire rod" is a material before cold wire-drawing. The wire rod is manufactured by hot-rolling, followed by patenting.

From the point of view of the drawability and the strength, it is preferable that wire-drawn pearlite is most abundant for the microstructure of the core material of the steel wire. It is more preferable that the whole microstructure of the wire rod is substantially composed only of pearlite. Also, the pearlite fraction of undrawn wire rod is substantially equivalent to the wire-drawn pearlite fraction of the Zn—Al coated steel wire. Accordingly, if the non-pearlite fraction, such as ferrite or bainite, of the undrawn wire rod increases, the fatigue property and the ductility of the Zn—Al coated steel wire may become lower. Accordingly, the pearlite fraction of the wire rod is preferably 92% or higher. More preferably, the pearlite fraction is 95% or higher. The pearlite fraction is obtained by taking micrographs of 10 different visual fields or more at a magnification of 2,000-fold using SEM, measuring pearlite area fractions by image analysis and calculating the average thereof. Also, the observation is performed at a position of d/4 from the surface layer of the wire rod (d: diameter of the steel wire). Also, the pearlite fraction of the undrawn wire rod may be estimated from the pearlite fraction of the Zn—Al coated steel wire.

Block size of the pearlite is a factor which affects the drawability of the wire rod, and the torsion number and the the fatigue properties of the drawn Zn—Al coated steel wire. If the block size of the pearlite is controlled to 25 µm or less, it is possible to prevent a deterioration in the drawability, the torsion number or the fatigue properties. Accordingly, the upper limit of the block size of the pearlite is preferably 25 µm or less.

The block size of the pearlite may be generally measured by using an etch-pit method, or an electron backscatter diffraction pattern (EBSD) method. In the present invention, the EBSD method is used in order to accurately measure the block size of the pearlite. The measurement of the block size of the pearlite is carried out at the position of d/4 (d: diameter of the steel wire) from the surface layer of the wire rod and the average from three different visual fields is calculated.

Also, the block size depends on finishing temperature of hot-rolling, cooling rate after hot-rolling, and alloy elements such as Mo, V, B, Al, Ti, Nb, Zr and the like. Accordingly, the block size of the pearlite is controlled by controlling manufacturing conditions, and the kind and amount of alloy elements added according to the hot-rolling machine performance.

The thickness of cementite of pearlite of the wire rod affects both the ductility of the drawn steel wire and the fatigue properties of the Zn—Al coated steel wire. When the cementite thickness of the Zn—Al coated steel wire increases, the workability of cementite deteriorates during wire-drawing. As a result, the torsion number of the Zn—Al coated steel wire frequently decreases and the fatigue properties slightly deteriorate. Accordingly, the cementite thickness of the wire rod is preferably 0.03 µm or less.

In the pearlite, even with the same lamellar spacing, the cementite thickness increases as the amount of C increases. Also, cementite thickness and C content of the pearlite of the drawn Zn—Al coated steel wire is affected by the cementite thickness and C content of the wire rod. Accordingly, correlation between the cementite thickness/C content of the wire rod, and the torsion number/the fatigue properties of the Zn—Al coated steel wire is investigated. As a result, for the 1800 MPa class, it is obvious that, when the cementite thickness is 0.03 µm or less, and the content of C is set at 0.027×C % or less, even the high-strength Zn—Al coated steel wire can exhibit excellent torsion number and fatigue properties. For the 2000 MPa class, the aforementioned content of C is set at 0.026×C % or less. For this reason, the cementite thickness of the wire rod is set at 0.03 µm or less, and is preferably 0.027×C % or less (for 1800 MPa class) or 0.026×C % or less (for 2000 MPa class).

In the invention, the cementite thickness of the wire rod is measured with TEM. TEM samples are taken from an overlapping part of rings of wire rod on the Stelmor conveyer after hot-rolled. And the observation is carried out at the position of d/4 (d: diameter of the steel wire) from the surface in the longitudinal section. The TEM observation is performed by selecting the visual fields perpendicular to the cementite plates and taking micrographs at a magnification of 10,000-fold to 20,000-fold and the cementite thickness is determined from the average in 10 different visual fields or more.

Also, as the tensile strength of the wire rod increases, the strength of the steel wire after wire-drawing also increases. When the tensile strength of the wire rod is 1250 MPa or higher and the tensile strength of the Zn—Al coated steel wire is controlled to be over 1800 MPa by wire-drawing, a decrease in the ductility can be prevented. Also, when the tensile strength of the wire rod is 1350 MPa or higher and the tensile strength of the Zn—Al coated steel wire is controlled to be over 2000 MPa by wire-drawing, a decrease in the ductility can be prevented. Also, when the dispersion in longitudinal strength of the wire rod is 50 MPa or less, a deterioration in the torsion number and the fatigue properties of the coated steel wire can be prevented. The tensile test of the wire rod of the invention is carried out by using 12 pieces of test specimens prepared by equally dividing one ring of coiled wire rod. Also, in order to determine the dispersion in the tensile strength of wire rod, the tensile test is carried out using 36 test specimens in total taken from three rings of the coil, and then obtaining the maximum and minimum value of the tensile strength.

Next, a method for manufacturing a Zn—Al coated steel wire according to the invention is described below. The Zn—Al coated steel wire of the invention is manufactured by patenting after hot-rolling, wire-drawing, flux treatment and hot-dip Zn—Al coating using a 1-bath method.

The wire rod of the present invention is manufactured by rolling and patenting, in which billets are hot-rolled and then the hot-rolled wire rod is cooled in salt bath at 500° C. to 600° C. for the 1500 MPa class or at 520° C. to 600° C. for the 1800 MPa and 2000 MPa classes. On the other hand, in manufacturing general-purpose materials, re-heating and patenting method in which the hot-rolled wire rod is re-heated and then is immersed in molten Pb bath is commonly used.

The wire rod prepared by rolling and patenting (rolled and patented material) has a higher strength than that of the wire rod prepared by re-heating and patenting (reheated and patented material). For this reason, by using the wire rod of the present invention, the strength of the steel wire can be improved by small strain of wire-drawing, and the torsion number and the fatigue properties of the Zn—Al coated steel wire considerably increase.

Cooling rate after hot-rolling: when a cooling rate at which the wire rod is cooled prior to immersion in salt bath after hot-rolling is excessively low, coarse pearlite tends to be formed during cooling. Accordingly, the cooling rate is preferably 10° C./s or higher, in order to improve the drawability.

Salt bath temperature: for the steel wire of 1600 MPa class, the salt-bath temperature is preferably 500° C. to 600° C. Also, for the steel wire of 1800 MPa class or 2000 MPa class, the salt bath temperature is preferably 520° C. to 600° C.

When the salt bath temperature is the above-mentioned lower limit or higher, it is possible to avoid transforming to bainite which deteriorates the drawability or the fatigue properties. On the other hand, when the salt-bath temperature is the above-defined upper limit or lower, the desired fineness of the pearlite can be secured. Accordingly, in order to improve the strength, the ductility and the fatigue properties of the Zn—Al coated steel wire, the salt-bath temperature is preferably limited to the range as defined above.

Next, in the present invention, a cold-drawing is performed by using the rolled and patented wire rod as raw material.

Wire-drawing strain: when the wire rod of the present invention is used as raw materials, in order to control the strength of the Zn—Al coated steel wire, the wire-drawing strain is preferably, by true strain, in the range of 1.3 to 2.0 for the 1500 MPa class, and in the range of 1.5 to 2.0 for the 1800 MPa class and the 2000 MPa class. In addition, the range of wire-drawing strain to obtain a desired strength of the Zn—Al coated steel wire varies depending on wire-drawing conditions, such as the strength of the wire rod after patenting, the chemical composition of steel which affects the work hardening rate during wire-drawing, the reduction of area for each dies, or the working speed of the wire-drawing. Accordingly, to obtain the desired strength, the Zn—Al coated steel wire of the invention is drawn under the wire-drawing strain suitably controlled within the range. Herein, the true strain of the wire-drawing strain is a value obtained by the equation of 2×ln (wire diameter before wire-drawing/wire diameter after wire-drawing), in which ln represents the natural logarithm.

Temperature of steel wire during wire-drawing: the temperature of the steel wire during wire-drawing is preferably controlled to 250° C. or lower to inhibit decomposition of cementite and inhibit diffusion of carbon. When the temperature of the steel wire upon wire-drawing is 250° C. or lower, an increase in concentration of carbon in ferrite is prevented and excellent ductility can be thus secured. In order to improve torsional performance of the Zn—Al coated steel wire, the temperature of the steel wire during wire-drawing is more preferably controlled to 200° C. or lower. The steel wire temperature may be measured by a contact-type thermometer, a radiation-type thermometer or the like. Also, controlling the temperature of the steel wire during wire-drawing may be carried out by various methods such as application of cold wire-drawing, a decrease in the working speed of the wire-drawing, use of wire-drawing lubricant having a low friction coefficient, dies with a suitable shape, and a suitable reduction of area for each die. This method may be used alone or combination thereof.

In addition, according to the present invention, it is preferable that at least one of roller straightening and heat treatment may be conducted for the steel wire. For example, in the heat treatment, the steel wire is held at 400° C. to 500° C. for 1 sec to 60 sec in the case of 1800 MPa class, and at 450° C. to 550° C. for 1 sec to 60 sec in the case of 2000 MPa class.

Roller-straightening: roller-straightening is effective in reducing residual strain of the steel wire and increasing the torsion number which decreases due to high-strengthening. As a result, the fatigue properties of the Zn—Al coated steel wire can finally be improved.

Heat treatment: heat treatment is also effective in reducing residual strain of the steel wire, and improving the torsion number and the fatigue properties. In order to obtain the effects, the temperature of the heat treatment is preferably equal to or higher than the lower limit in the aforementioned temperature range. On the other hand, to secure the strength of the steel wire, the heat treatment temperature is preferably equal to or lower than the upper limit of the aforementioned temperature range. Also, to obtain the effects of the heat treatment, the holding time is preferably 1 sec or longer. On the other hand, in order to secure the strength of the steel wire, the holding time is preferably 60 sec or less. For example, the heat treatment may be carried out by using a conventional heat treatment method such as the use of a heat treatment furnace or immersion in bath with a controlled temperature.

After wire-drawing, roller-straightening and the heat treatment, the steel wire is coated with Zn—Al. The Zn—Al coating may be carried out by, for example, immersing the steel wire as a substrate in molten metal bath containing Zn—Al and optionally containing Si which is the same composition as that of the predetermined coating layer. Also, the steel wire to be coated is generally subjected to alkaline degreasing or acid-pickling prior to immersion in molten coating bath, in order to improve the wettability of the steel wire to be coated, the coating adhesion and the like.

The steel wire to be coated is treated with a flux prior to immersion in molten coating bath.

In a conventional 2-bath Zn—Al alloy coating method, a flux including ammonium chloride as a main component was used. However, even if molten Zn—Al alloy coating bathing is performed after the conventional ammonium chloride fluxing, the coating is not sufficiently adhered. The cause is that the ammonium chloride flux is decomposed in Al-containing molten Zn—Al bath. In order to avoid this problem, the conventional method requires pre-coating using Zn-coating. For this reason, 2-bath Zn—Al alloy coating method including two coating processes in total was used.

The method according to one embodiment of the present invention includes no pre-coating using galvanizing. Instead, a flux containing components except for ammonium chloride was developed. Zn—Al coating can be efficiently adhered by using the flux mentioned below.

Flux treatment: flux treatment uses zinc chloride, ammonium chloride, chlorides and fluorides of an alkali metal, tin chloride, and the like. The flux includes zinc chloride as a main component, preferably includes potassium chloride and tin fluoride, and may further include at least of one of ammonium chloride, chloride of an alkali metal, and tin chloride. After flux treatment, the steel wire to be coated is dried and is then immersed in molten coating bath. The composition of flux is not particularly limited, but, for example, the flux may be aqueous solution with a total flux concentration of 10% to 40% containing 30% to 40% of $Zn^{2+}$ ions, 8% to 12% of $K^+$ ions, 2% to 3% of $Sn^{2+}$ ions, and 45% to 60% of the total amount of $Cl^-$ and $F^-$ ions, and having a pH ranging from 0.5 to 2.0. An immersion time of the flux is preferably 0.5 sec or longer.

Instead of the flux-treatment, in the present invention, the steel wire to be coated may be treated by: reduction annealing using a combination of a non-oxidation furnace and a reduction furnace, or using a reduction furnace; immersing in molten coating bath; and then drawn up. After the Zn—Al coating, in a continuous operation, adhesion amount of coating is controlled by a gas-wiping method and then the Zn—Al coated steel wire is cooled.

The concentration of Al in the molten Zn—Al bath is controlled within the range of 3.0% to 15.0% according to the desired amount of Al of the Zn—Al coating. To improve the corrosion resistance of coating, the amount of Al is preferably 6.0% or higher, and more preferably 8.0% or higher. Also, when Si exists in the Zn—Al coating, the amount of 2.0% or less is added, depending on the desired amount of Si in the Zn—Al coating. In practice, the lower limit of the amount of Si added is 0.01% or higher. In order to inhibit alloy layer growth, Si is preferably added in an amount of 0.05% or higher. Also, to prevent coating from hardening, the amount of Si is preferably 1.5% or less. Also, the composition of molten Zn—Al bath may be obtained by sampling a specimen from the molten coating bath, dissolving the sample in an undiluted hydrochloric acid; and subjecting the solution to the chemical analysis.

Also, when the steel wire to be coated is immersed in molten coating bath, an alloy layer begins to be formed in the interface between the coating and the steel substrate. Also, the alloy layer is grown after the steel wire is drawn up from the molten coating bath until the temperature thereof is lowered to about 300° C. or lower. Accordingly, control of the alloy layer thickness in the interface may be carried out by controlling the molten coating bath temperature, the immersion time of the steel wire to be coated, and the cooling rate after coating.

The conditions to form the coating layer having a suitable interface alloy layer are not particularly limited, because optimal conditions may be varied more or less depending on the type of target steel wire, and the components and temperature of molten coating baths. In the present invention, for example, in a Zn-10% Al-0.5Si coating, since the solidification temperature is about 420° C., it is preferable that the steel wire is immersed in a molten metal bath at 440° C. to 520° C. for 1 sec to 60 sec, and then is cooled at a cooling rate of 10° C./s to 20° C./s. The solidification temperature of the molten coating bath of the present invention is varied depending on the compositions of the molten coating bath and is in the range of about 390° C. to 450° C. Accordingly, the Zn—Al coated steel wire having a suitable alloy layer can be obtained by selecting optimal conditions respectively from the conditions such that the steel wire is immersed in the molten coating bath whose temperature (410° C. to 550° C.) is 20° C. to 100° C. higher than the solidification temperature, an immersion time is 1 sec to 60 sec, and the cooling rate after solidification is 5° C./s to 50° C./s. In addition, to inhibit growth of the alloy layer and make a grain size of primary phase fine, it is preferable that the immersion time in the molten coating bath is 15 sec or less, and the cooling rate is 10° C./s or higher.

EXAMPLES

Hereinafter, the effects of the coated steel wire according to one embodiment of the present invention are described in detail with reference to the following examples.

Example 1

A steel material containing 0.77% of C, 0.22% of Si, 0.78% of Mn, 0.006% of P, 0.008% of S, 0.031% of Al, and the balance consisting of Fe and unavoidable impurities was hot-rolled to obtain wire rod. The wire rod was cooled in salt bath at 525° C. just after hot-rolling as patenting. In addition, the wire rod was cold-drawn to obtain a steel wire with a wire diameter of 4.9 mm. The steel wire was degreased, pickled with acid, immersed in flux aqueous solution at 60° C. for 10 sec, dried and then coated under conditions as shown in Tables 1 to 3 below. Also, the coating thickness was controlled to be 50 μm by wiping.

In addition, a flux used for Zn—Al coating herein was aqueous solution having a total flux concentration of 15% and a pH of 1.0, and was controlled to 30% to 40% of $Zn^{2+}$ ions, 8% to 12% of $K^+$ ions, 2% to 3% of $Sn^{2+}$ ions, and 45% to 50% of the total amount of $Cl^-$ and $F^-$ ions. In addition, 7% $NH_4Cl$ aqueous solution was used as a flux for galvanizing.

Also, Test Nos. 76 to 79 are samples which are not coated with Zn—Al but are coated by galvanizing. Also, Test Nos. 85 to 90 are samples which are subjected to a 2-bath method which is Zn—Al alloy coating just after galvanizinwithout a flux treatment.

The composition of coating as shown in Tables 1 and 2 was determined by immersing the coating at room temperature for several minutes in HCl solution prepared by dissolving 1 mL of a commercially available acid-pickling corrosion inhibitor and 140 mL of HCl in 1 L of pure water, dissolving the coating layer and alloy layer (Fe—Al alloy layer), and then performing ICP analysis.

The coated steel wire was observed with SEM to measure a fraction of the wire-drawn pearlite of the core material and the grain size of primary phase of the coating layer. Also, the alloy layer (Fe—Al alloy layer) was observed with TEM to measure a thickness of the alloy layer and the state of the interface alloy layer was evaluated. Also, the evaluation of the interface alloy layer is as follows:

A: the interface alloy layer is a tri-layer mainly including $Al_5Fe_2$ columnar grains, $Al_{3.2}Fe$ columnar grains and Fe—Al—Si granular grains.

B: the interface alloy layer is a di-layer mainly including $Al_5Fe_2/Al_{3.2}Fe$ columnar grains and Al columnar grain.

C: the interface alloy layer is a mono-layer mainly including Fe—Al columnar grains.

D: the interface alloy layer is a mono-layer mainly including Zn—Fe or Zn—Fe—Al.

The corrosion resistance of the coated steel wire was evaluated by conducting the salt spray testing (JIS Z 2371) for 360 hours with the coated steel wire which was cut into lengths of 100 mm, and by clocking the time until the generation of red rust. The meanings of the symbols are as follows:

A: the time until the generation of red rust is 360 hours or longer.

B: the time until the generation of red rust is equal to or longer than 300 hours and is less than 360 hours.

C: the time until the generation of red rust is equal to or longer than 240 hours and is less than 300 hours.

D: the time until the generation of red rust is less than 240 hours.

The coating composition, corrosion test results and observation results of interface alloy layer are shown in Tables 1 to 3.

[Table 1]

In Table 1, a blank in an Al or Si content means that the element is not intentionally added.

[Table 2]

[Table 3]

In Table 3, a blank in an Al content or Si content means that the element is not intentionally added. Coating Nos. 77 to 80 are prepared by galvanizing. Coating Nos. 86 to 91 are prepared by a 2-bath method.

As can be seen from the aforementioned results, the coating composition and microstructure of the Zn—Al coating which have the thickness of the alloy layer and the grain size of primary phase satisfying the requirement of the present invention can be obtained by controlling the bath temperature, immersion time and cooling rate using the coating composition of the present invention, and the Zn—Al coating exhibits excellent corrosion resistance.

Hereinafter, the effects of the coated steel wire according to another embodiment of the prevent invention are described in detail with reference to the following examples.

The following examples demonstrate that the Zn—Al coating satisfying the requirement of the thickness of the alloy layer and the grain size of primary phase in the present invention exhibits excellent fatigue resistance.

Example 2

The chemical components of a test material are shown in Table 4. The test material was hot-rolled and then directly cooled in salt bath just after hot-rolling to perform patenting. Also, a steel A shown in Table 4 has the same component as in Example 1. The obtained wire rod was cold-drawn to obtain a high-carbon steel wire with a wire diameter of 4.5 mm to 7.3 mm, and hot-dip Zn—Al coating was performed by a 1-bath method. For comparison, 2-bath hot-dip Zn—Al coating (galvanizing and then hot-dip Zn—Al coating) and galvanizing were performed.

[Table 4]

In Table 4, the symbol "-" means that an element is not intentionally added. An underlined value means that the value is out of the range of the present invention.

The hot-dip coating was carried out by degreasing the steel wire, pickling with acid, immersing in flux aqueous solution at 60° C. for 10 sec, drying and then immersing in molten coating bath with a predetermined composition for 5 sec to 15 sec. The temperature of molten coating bath was 450° C. to 500° C. The cooling rate after hot-dip coating may be varied according to the wire diameter, thus the cooling rate of all the hot-dip coating was controlled to 10° C./s to 20° C./s. Also, the thickness of all the hot-dip coating was controlled to be about 50 μm by wiping. Also, the 2-bath Zn—Al coating was performed by galvanizing steel wire at 450° C. and then immersing the steel wire in molten Zn—Al bath just after the galvanizing without flux treatment. Also, the 1-bath Zn—Al hot-dip coating and galvanizing used the same flux as in Example 1.

In the same manner as in Example 1, the coated steel wire was observed with SEM, to measure the fraction of the wire-drawn pearlite of the core material and a grain size of the primary phase, the coated steel wire was observed with TEM to measure a thickness of the alloy layer (Fe—Al alloy layer) and the state of the alloy layer was evaluated, and the corrosion resistance of the coated steel wire was evaluated.

The fatigue limit of the coated steel wire was evaluated by the partially pulsating tensile fatigue test. The fatigue limit (maximum stress minus minimum stress) which was evaluated at the repeating cycles of $2\times10^6$ was obtained by varying maximum stress with a fixed minimum stress according to the tensile strength of the coated steel wire, wherein 490 MPa was used as the standard.

The torsional performance was evaluated by using 100 torsion test specimens serially sampled from the manufactured Zn—Al coated steel wire and subjecting the test specimens to the torsion test. The torsion test was carried out by griping both ends of test specimen with a distance between the grips of 100 times of the wire diameter, rotating one end of the specimen in one direction at a torsion rate of 10 rpm while the test specimen was given tension in order not to warp, and measuring the torsion number at which the test specimen was fractured. The torsion test was repeated 100 times and the minimum torsion number therein was determined.

The results are shown in Tables 5 to 8. In Tables 5 to 8, Test Nos. 1 to 32 are examples of the present invention and the remaining are comparative examples. All the Zn—Al coated steel wires according to the examples of the present invention show 90% or higher of wire-drawn pearlite. On the other hand, in comparative examples, although all steel wires have wire-drawn pearlite, the pearlite of Test Nos. 40 and 42, is lower than 90%. As can be seen from the Table, all the Zn—Al coated steel wires according to examples of the present invention actualize excellent corrosion resistance, good torsion number, high ratio of the fatigue limit to the tensile strength, and excellent fatigue properties.

On the other hand, comparative examples, i.e., Test Nos. 33 to 38, are conventional galvanized steel wires. These tests are examples which exhibit a high torsion number and good fatigue properties, but poor corrosion resistance.

Test Nos. 39 and 40 are examples in which the chemical components of the steel wire are unsuitable. Test No. 39 is an example in which the target tensile strength of 1500 MPa or higher cannot be finally obtained due to an excessively small C content. Test No. 40 is an example in which a bainite fraction is excessively high due to an excessively large Mn content and, as a result, the fatigue properties as well as the torsion number deteriorate.

Test Nos. 41 and 42 are examples in which the temperature of salt bath for patenting after hot-rolling is unsuitable. Test No. 41 is an example in which the desired tensile strength of 1500 MPa or higher cannot be obtained due to excessively high patenting temperature. On the other hand, Test No. 42 is an example in which the bainite fraction increases and the fatigue properties as well as the torsion number thus deteriorate due to an excessively low patenting temperature.

Test Nos. 43 to 46 are examples of Zn—Al alloy coated steel wires obtained by a conventional 2-bath method. All these tests exhibit excellent corrosion resistance, but deteriorate the fatigue properties and thus cannot obtain the desired ratio of the fatigue limit to the tensile strength of 0.22 or higher due to the large thickness of alloy layer (Fe—Al alloy layer).

[Table 5]

[Table 6]

In Table 6, a blank in the Al or Si content means that the element is not intentionally added. Test Nos. 33 to 38 are performed by galvanizing. Test Nos. 43 to 46 are performed by a 2-bath method.

[Table 7]
[Table 8]

Hereinafter, the effects of the coated steel wire according to another embodiment of the prevent invention are described with reference to the following examples in detail.

Example 3

The chemical components of a test material associated with Example 3 are shown in Table 9. The test material was hot-rolled and then directly cooled in salt bath just after hot-rolling to perform patenting. The microstructure of the obtained wire rod was observed with SEM and TEM to measure the pearlite fraction and the cementite thickness thereof. The tensile strength was measured in accordance with JIS Z 2241. The difference in the tensile strength of the wire rod was determined by conducting the tensile test by using 36 test specimens in total sampled from three rings of the coil, and by calculating the difference between the maximum and minimum in the tensile strength. Table 10 shows the patenting temperature, the pearlite fraction and the cementite thickness of the wire rod, the tensile strength, and the difference in the tensile strength. Table 10 also shows a value calculated by the equation of 0.027×C.

[Table 9]

In Table 9, an underlined value means that the value is out of the range of the present invention and the symbol "-" means that the element is not intentionally added.

[Table 10]

In Table 10, an underlined value means that the value is out of the range of the present invention.

The obtained wire rod was cold-drawn to obtain a high-carbon steel wire with a wire diameter of 4.5 mm to 7.3 mm, and hot-dip Zn—Al coating was performed by a 1-bath method. For comparison, 2-bath hot-dip Zn—Al coating (galvanizing and then hot-dip Zn—Al coating) and galvanizing were performed. In addition, the temperature during wire-drawing was measured by a radiation thermometer. Also, roller-straightening or the heat treatment was performed as necessary.

The hot-dip coating was carried out by degreasing the steel wire, pickling with acid, immersing in flux aqueous solution at 60° C. for 10 sec, drying, and then immersing in molten coating bath with a predetermined composition for 5 sec to 15 sec. The temperature of molten coating bath was 450° C. to 500° C. The cooling rate after hot-dip coating may be varied according to the wire diameter, thus the cooling rate of all the hot-dip coating except Test No. 64' was controlled to 10° C./s to 20° C./s. Also, the coating thickness of all the hot-dip coating was controlled to be about 50 μm by wiping. Also, the 2-bath Zn—Al coating was performed by galvanizing the steel wire at 450° C. and then immediately immersing the steel wire in molten Zn—Al bath without flux treatment.

Herein, aqueous solution of pH 1.0, which was controlled to 30% to 40% of $Zn^{2+}$ ions, 8% to 12% of $K^+$ ions, 2% to 3% of $Sn^{2+}$ ions, 45% to 50% of the total amount of $Cl^-$ ions and $F^-$ ions, was used as the flux of 1-bath hot-dip Zn—Al coating. Also, for the flux of the galvanizing, 7% $NH_4Cl$ aqueous solution was used. Tables 11 to 13 show manufacturing conditions and the coating composition of the coated steel wires.

[Table 11]

In Table 11, the symbol "-" means unadministered test and a blank in the coating composition column means that the element is not intentionally added.

[Table 12]

In Table 12, the symbol "-" means unadministered test and a blank in the coating composition column means that the element is not intentionally added.

[Table 13]

In Table 13, the symbol "-" means unadministered test and a blank in the coating composition column means that the element is not intentionally added.

The composition of coating was determined by immersing the coating at room temperature for several minutes in HCl solution prepared by dissolving 1 mL of a commercially available acid-pickling corrosion inhibitor and 140 mL of HCl in 1 L of pure water to dissolve the coating layer and alloy layer (Fe—Al alloy layer), and then performing ICP analysis. The coated steel wire was observed with SEM to measure the fraction of the wire-drawn pearlite of the core material and the grain size of primary phase of the coating. Also, the alloy layer was observed with TEM to measure a thickness of alloy layer, and the state of interface alloy layer was evaluated. The state of the interface alloy layer was evaluated as follows:

A: the interface alloy layer is a tri-layer mainly including an $Al_5Fe_2/Al_{3.2}Fe$ columnar grain and a Fe—Al—Si granular grain.

B: the interface alloy layer is a di-layer mainly including an $Al_5Fe_2/Al_{3.2}Fe$ columnar grain and an Al columnar grain.

C: the interface alloy layer is a mono-layer mainly including a Fe—Al columnar grain.

D: the interface alloy layer is a mono-layer mainly including Zn—Fe or Zn—Fe—Al.

The fatigue limit of the coated steel wire was evaluated by the partially pulsating tensile fatigue test. The fatigue limit (maximum stress minus minimum stress) which was evaluated at the repeating cycles of $2 \times 10^6$ was obtained by varying maximum stress with a fixed minimum stress according to the tensile strength of the coated steel wire, wherein 490 MPa was used as the standard.

The torsional performance was evaluated by using 100 torsion test specimens serially sampled from the manufactured Zn—Al coated steel wire and subjecting the test specimens to the torsion test. The torsion test was carried out by griping both ends of test specimen with a distance between the grips of 100 times of the wire diameter, rotating one end of the specimen in one direction at a torsion rate of 10 rpm while the test specimen was given tension in order not to warp, and measuring the torsion number at which the test specimens was fractured. The torsion test was repeated 100 times and the minimum of the torsion number therein was determined.

The corrosion resistance of the coated steel wire was evaluated by conducting the salt spray testing (JIS Z 2371) for 360 hours with the coated steel wire which was cut into lengths of 100 mm, and by clocking the time until the generation of red rust. The meanings of the symbols are as follows:

A: the time until the generation of red rust is 360 hours or longer.

B: the time until the generation of red rust is equal to or longer than 300 hours and is less than 360 hours.

C: the time until the generation of red rust is equal to or longer than 240 hours and is less than 300 hours.

D: the time until the generation of red rust is less than 240 hours.

The results are shown in Tables 14 to 16. Also, the symbols for the width of primary phase (dendrite) indicate the following meanings.

A: the width of primary phase (dendrite) is 5 μm or less.

B: the width of primary phase (dendrite) is 10 μm or less.

D: the width of primary phase (dendrite) exceeds 10 μm.

[Table 14]
[Table 15]
[Table 16]

Test Nos. 1' to 47' shown in Tables 14 and 15 are examples according to the present invention. Test Nos. 48' to 72' shown in Table 16 are comparative examples. The coating composition and microstructure of the Zn—Al coating which have the thickness of the alloy layer and the grain size of the primary phase satisfying the requirement of the present invention can be obtained by controlling the bath temperature, immersion time and cooling rate using the coating composition of the present invention, and the Zn—Al coatings can actualize high strength, excellent corrosion resistance, good torsion number, high ratio of the fatigue limit to the tensile strength and excellent fatigue properties, as shown in Tables 14 and 15.

On the other hand, comparative examples, Nos. 48' to 50' are examples in which the chemical components of the steel wire are unsuitable. Test No. 48' contains a small amount of C, thus the tensile strength of the Zn—Al coated steel wire deteriorates. Also, Test No. 49' is an example in which the strength deteriorates during hot-dip coating and the desired tensile strength cannot be thus obtained due to an excessively small Si content. Test No. 50' is an example in which bainite is formed in the patented wire rod and the pearlite fraction cannot be controlled to a predetermined level due to an excessively large Mn content, and as a result, the difference between the maximum and minimum in the tensile strength increases, and the torsional performance and the fatigue properties thus deteriorate (see wire rod No. R1' shown in Table 10).

Comparative examples, Test Nos. 51', 52' and 55' are examples in which, the wire rods are air-patented after hot-rolling (See wire rod Nos. A2', B2', M2' in Table 10). As can be seen from Table 10, the cementite thickness and the difference between maximum and minimum in the tensile strength of the wire rod increase. As a result, as shown in Table 16, the torsional performance and the fatigue properties deteriorate.

Comparative examples, Test Nos. 53' and 54' are examples in which patenting after hot-rolling is unsuitable (see wire rod Nos. B3' and E2' in Table 10). Test No. 53' which used the wire rod B3' in Table 10 as a raw material exhibits a decrease in the pearlite fraction due to an excessively low patenting temperature, a decrease in the torsion number of the coated steel wire and a deterioration in the fatigue properties, as shown in Table 16. On the other hand, Test No. 54 which used the wire rod E2' in Table 10 as a raw material exhibits an increase in cementite thickness and a decrease in the tensile strength after patenting due to an excessively high patenting temperature, and as a result, the tensile strength of the coated steel wire decreases and also the torsional performance and the fatigue properties deteriorate, as shown in Table 16.

Comparative examples, Test Nos. 56' to 58' are examples in which the temperature of the steel wire is unsuitable during wire-drawing (see wire rod Nos. H1', O2' and K2' in Table 10), and the torsional performance and the fatigue properties deteriorate because the steel wire temperature exceeded 250° C. Comparative examples, Test Nos. 59' and 60' are examples in which the heat treatment after wire-drawing is unsuitable. Both are examples in which the desired strength of the coated steel wires did not obtain due to an excessively high heating temperature in Test Nos. 59' and an excessively long heating time in Test Nos. 60'. Also, Test No. 59' is an example in which a part of the microstructure becomes spheroidal cementite and the torsional performance deteriorates due to an excessively high heating temperature.

Comparative examples, Test Nos. 61' to 65' are examples in which the chemical components of Zn—Al coating are unsuitable. Test Nos. 61' and 62' exhibit a decrease in the corrosion resistance due to an excessively low Al content. Test No. 63' is an example in which the fatigue properties deteriorate due to an excessively large Si content in the coating. Also, Test No. 64' is an example in which the alloy layer is grown by a low cooling rate after hot-dip coating. In Test No. 64', the fatigue properties deteriorate due to an excessively high Fe content in the coating. Also, Test No. 65' is an example in which the corrosion resistance and the fatigue properties deteriorate due to a low Al content and an excessively high Si content.

Comparative examples, Test Nos. 66' to 68' are examples of the steel wires obtained by a conventional galvanizing method. These are examples in which the desired high corrosion resistance of the steel wires is not obtained due to the conventional galvanizing.

Comparative examples, Test Nos. 69' to 72' are examples of the Zn—Al coated steel wires obtained by a conventional 2-bath method. These are examples in which excellent corrosion resistance is obtained, but the fatigue properties deteriorate due to the thick alloy layer, and thus a desired ratio of the fatigue limit to the tensile strength of 0.22 or higher is not obtained.

Example 4

Hereinafter, the effects of the coated steel wire according to another embodiment of the prevent invention are described in detail with reference to the following examples.

The chemical components of a test material are shown in Table 17. The test material was hot-rolled at a finishing temperature of 950° C. and then directly cooled in salt bath just after hot-rolling to perform patenting. In addition, for comparison, a test material was hot-rolled at a finishing temperature of 1090° C. and then cooled in air just after hot-rolling to perform patenting.

The microstructure of the obtained wire rod was observed with SEM and TEM to measure the pearlite fraction and the cementite thickness thereof. Also, the block size of the pearlite was measured by EBSD. The tensile strength was measured in accordance with JIS Z 2241. Also, the difference in the tensile strength of the wire rod was determined by conducting the tensile test by using 36 test specimens in total sampled from three rings of the coil, and by calculating the difference between the maximum and minimum in the tensile strength. Table 18 shows the patenting temperature, the pearlite fraction and the cementite thickness of the wire rod, the tensile strength, and the difference in the tensile strength. Table 18 also shows a value calculated by the equation of $0.026 \times C$.

[Table 17]

In Table 17, the symbol "-" means that the element is not intentionally added and an underlined value means that the value is out of the range of the present invention. A value in the column "*1" is the value calculated by the equation of $105 \times C\% + 9 \times Si\% - 2 \times Mn\% + 17 \times Cr\%$.

[Table 18]

The obtained wire rod was cold-drawn to obtain a high-carbon steel wire with a wire diameter of 4.3 mm to 7.3 mm, and hot-dip Zn—Al coating was performed by a 1-bath method. For comparison, 2-bath hot-dip Zn—Al coating (galvanizing and then hot-dip Zn—Al coating) and galvanizing were performed. In addition, the temperature during wire-drawing was measured by a radiation thermometer. Also, roller-straightening or the heat treatment was performed as necessary.

The hot-dip coating was carried out by degreasing the steel wire, pickling with acid, immersing in flux aqueous solution at 60° C. for 10 sec, drying, and then immersing in molten coating bath with a predetermined composition for 5 sec to 15 sec. The temperature of molten coating bath was 450° C. to 500° C. The cooling rate after hot-dip coating may be varied according to the wire diameter, thus the cooling rate of all the hot-dip coating except Test No. 84" was controlled to 10° C./s to 20° C./s.

The hot-dip coating was carried out by degreasing the steel wire, pickling with acid, immersing in flux aqueous solution at 60° C. for 10 sec, drying, and then immersing in molten coating bath with a predetermined composition for 30 sec. The hot-dip coating was carried out at a temperature of 450° C. to 470° C. The cooling rate after hot-dip coating may be varied according to the wire diameter, thus the cooling rate of all the hot-dip coating was controlled to be about 15° C./s.

Also, the coating thickness of all the hot-dip coating was controlled to about be 50 μm by wiping. Also, 2-bath Zn—Al coating was performed by performing the galvanizing and the steel wire at 450° C. and then immersing the steel wire in molten Zn—Al bath just after the galvanizing without flux treatment.

Herein, aqueous solution of pH 1.0, which was controlled to 30% to 40% of $Zn^{2+}$ ions, 8% to 12% of $K^+$ ions, 2% to 3% of $Sn^{2+}$ ions, and 45% to 50% of the total amount of $Cl^-$ ions and $F^-$ ions, was used as the flux of 1-bath hot-dip Zn—Al coating. Also, for the flux of the galvanizing, 7% $NH_4Cl$ aqueous solution was used. Tables 19 to 21 show manufacturing conditions and the coating composition of the coated steel wires.

[Table 19]

In Table 19, the symbol "-" means unadministered test and a blank in the coating composition column means that the element is not intentionally added.

[Table 20]

In Table 20, the symbol "-" means unadministered test and a blank in the coating composition column means that the element is not intentionally added.

[Table 21]

In Table 21, the symbol "-" means unadministered test and a blank in the coating composition column means that the element is not intentionally added.

The composition of coating was determined by immersing the coating at room temperature for several minutes in HCl solution prepared by dissolving 1 mL of a commercially available acid-pickling corrosion inhibitor and 140 mL of HCl in 1 L of pure water, dissolving the coating layer and alloy layer, and then performing ICP analysis. The coated steel wire was observed with SEM to measure the fraction of the wire-drawn pearlite of the core material and the grain size of the primary phase of the coating layer. Also, the alloy layer was observed with TEM to measure a thickness of the alloy layer and the state of interface alloy layer was evaluated. Also, the evaluation of the interface alloy layer is as follows:

A: the interface alloy layer (Fe—Al alloy layer) is a tri-layer mainly including an $Al_5Fe_2/Al_{3.2}Fe$ columnar grain and a Fe—Al—Si granular grain.

B: the interface alloy layer is a di-layer mainly including an $Al_5Fe_2/Al_{3.2}Fe$ columnar grain and an Al columnar grain.

C: the interface alloy layer is a mono-layer mainly including a Fe—Al columnar grain.

D: the interface alloy layer is a mono-layer mainly including Zn—Fe or Zn—Fe—Al.

The fatigue limit of the coated steel wire was evaluated by the partially pulsating tensile fatigue test. The fatigue limit (maximum stress minus minimum stress) which was evaluated at the repeating cycles of $2 \times 10^6$ was obtained by varying maximum stress with a fixed minimum stress according to the tensile strength of the coated steel wire, wherein 490 MPa was used as the standard.

The torsional performance was evaluated by using 100 torsion test specimens serially sampled from the manufactured Zn—Al coated steel wire and subjecting the test specimens to the torsion test. The torsion test was carried out by griping both ends of test specimen with a distance between the grips of 100 times of the wire diameter, rotating one end of specimen in one direction at a torsion rate of 10 rpm while the test specimens was given tension in order not to warp, and measuring the torsion number at which the test specimens was fractured. The torsion test was repeated 100 times and a minimum of the torsion number therein was determined.

The corrosion resistance of the coated steel wire was evaluated by conducting the salt spray testing (JIS Z 2371) for 360 hours with the coated steel wire which was cut into lengths of 100 mm, and by clocking the time until the generation of red rust. The meanings of symbols are as follows:

A: the time until the generation of red rust is 360 hours or longer.

B: the time until the generation of red rust is equal to or longer than 300 hours and is less than 360 hours.

C: the time until the generation of red rust is equal to or longer than 240 hours and is less than 300 hours.

D: the time until the generation of red rust is less than 240 hours.

The results are shown in Tables 22 to 24. Also, the symbols for the width of primary phase (dendrite) indicate the following meanings.

A: the width of primary phase (dendrite) is 5 μm or less.

B: the width of primary phase (dendrite) is 10 μm or less.

D: the width of primary phase (dendrite) exceeds 10 μm.

[Table 22]

[Table 23]

[Table 24]

Test Nos. 1" to 55" shown in Tables 22 and 23 are examples according the present invention. Test Nos. 56" to 85" shown in Table 24 are comparative examples. As shown in Tables 22 and 23, the coating composition and microstructure of the Zn—Al coating which have the thickness of the alloy layer and the grain size of primary phase satisfying the requirement of the present invention can be obtained by controlling the bath temperature, immersion time and cooling rate using the coating composition of the present invention, and the Zn—Al coatings can actualize high strength, excellent corrosion resistance, good torsion number, high ratio of the fatigue limit to the tensile strength and excellent fatigue properties.

On the other hand, comparative examples, Nos. 56" to 61" are examples in which the chemical components of the steel wire are unsuitable. Test No. 56" contains a small amount of C, thus the tensile strength of the Zn—Al coated steel wire decreases. Also, Test No. 57" includes no Cr and thus exhibits a decrease in the tensile strength of the wire rod after patenting and the tensile strength of coating wire, as shown in Table 18. Also, Test No. 58" is an example in which the tensile strength of coating wire decreases because of a decrease in the strength during immersion in molten coating bath, which results from an excessively small Si content. Test No. 59" is an example in which pro-eutectoid cementite is formed in the grain boundaries during patenting due to an excessively large C content, and as a result, the torsional performance and the fatigue properties deteriorate. Test No. 60" is an example in which bainite is formed during patenting due to an excessively large Cr content, and the pearlite fraction of the wire rod decreases, as shown in Table 18, and as a result, the torsional performance and the fatigue properties of the coated steel wire deteriorate. Also, Test No. 61" includes suitable contents of each components, but the value calculated by the equation of 105×C+9×Si−2×Mn+17×Cr is low, and thus the tensile strength of the coated steel wire decreases.

Comparative examples, Test Nos. 62" to 64" are examples in which the wire rod is patented by air-cooling after hot-rolling (see wire rod Nos. B2", F2" and J2" in Table 18). As a result, Test No. 62" shows a low tensile strength upon patenting and an increase in the difference between the maximum and minimum in the tensile strength, non-achievement of the desired tensile strength of the coated steel wire, and a deterioration in the torsional performance and the fatigue properties. Test No. 63" is an example in which the cementite thickness considerably increases, the drawability deteriorate and the wire is fractured during wire-drawing. Test No. 64" is an example which exhibits an increase in cementite thickness, an increase in the difference between the maximum and minimum in the tensile strength and a deterioration in the torsional performance and the fatigue properties of the coated steel wire.

Comparative examples, Test Nos. 65" and 66" are examples in which the temperature of salt bath for patenting after hot-rolling is unsuitable (See wire rod Nos. B3" and G2" of Table 18). Test No. 65" is an example in which the bainite fraction increases, the torsion number decreases and the fatigue properties deteriorate due to an excessively low patenting temperature. On the other hand, Test No. 66" is an example in which the cementite thickness increases and the tensile strength after patenting deteriorates due to excessively high patenting temperature, and as a result, the desired tensile strength of the coated steel wire cannot be achieved and the torsional performance and the fatigue properties deteriorate.

Comparative examples, Test Nos. 67" and 68" are examples in which the finishing temperature of hot-rolling is excessively high and the block size of the pearlite exceeds 25 μm (See wire rod Nos. E2" and G3" of Table 18). For this reason, these examples exhibit a deterioration in the torsional performance wires and the fatigue properties of coated steel.

Comparative examples, Test Nos. 69" to 71" are examples in which the steel wire temperature during wire-drawing is unsuitable. These examples exhibit a deterioration in the torsional performance and the fatigue properties, since the steel wire temperature exceeds 200° C.

Comparative examples, Test Nos. 72" and 73" are examples in which the heat treatment after wire-drawing is unsuitable. Both are examples in which the desired strength of the coated steel wires cannot be obtained due to excessively high heating temperature in Test Nos. 72" and excessively long heating time in Test Nos. 73". Also, Test No. 71" is an example in which a part of the microstructure becomes spheroidal cementite, and thus the torsional performance and fatigue properties deteriorate due to excessively high heating temperature.

Comparative examples, Test Nos. 74" to 76" are examples of the steel wires obtained by a conventional galvanizing method. These steel wires are examples in which the desired high corrosion resistance of the steel wires is not obtained due to the conventional galvanizing.

Comparative examples, Test Nos. 77" to 80" are examples of the Zn—Al coated steel wires obtained by a conventional 2-bath method. These are examples in which excellent corrosion resistance is obtained, but the fatigue properties deteriorate due to the thick alloy layer (Fe—Al alloy layer) and undesired state of the interface alloy layer, and thus a desired ratio of the fatigue limit to the tensile strength of 0.22 or higher is not obtained.

Comparative examples, Test Nos. 81" to 85" are examples in which the chemical components of Zn—Al coating are unsuitable. Test Nos. 81" and 82' are examples which could not obtain the desired corrosion resistance due to an excessively low Al content. Test No. 83" is an example in which the fatigue properties deteriorate due to an excessively large Si content in the coating. Also, Test No. 84" is an example in which the alloy layer is grown by a low cooling rate after coating. In Test No. 84", the fatigue properties deteriorate due to an excessively high Fe content in the coating. Also, Test No. 85" is an example in which the corrosion resistance and the fatigue properties deteriorate due to a low Al content and an excessively high Si content.

As apparent from the above results, the present invention enables manufacturing the high-strength coated steel wire with excellent corrosion resistance and the fatigue properties.

INDUSTRIAL APPLICABILITY

The present invention efficiently provides the high-strength Zn—Al coated steel wire for bridges with excellent corrosion resistance and the fatigue properties and has considerable industrial applicability such as prolongment of lifetime of the steel wire for bridges.

TABLE 1

| Coating No. | Coating composition (mass %) | | | | Bath temperature | Immersion time (s) | Cooling rate (° C./s) | Thickness of alloy layer (μm) | Corrosion resistance | State of alloy layer | Grain size of primary phase (μm) | Remarks |
|---|---|---|---|---|---|---|---|---|---|---|---|---|
| | Al | Si | Fe | Zn | | | | | | | | |
| 1 | 8.2 | 1.5 | remainder | | 450 | 5 | 18 | 1.2 | A | B | 2.1 | Examples of the present invention |
| 2 | 8.1 | 1.8 | remainder | | 450 | 5 | 15 | 1.4 | A | B | 3.2 | |
| 3 | 7.9 | 2.0 | remainder | | 450 | 5 | 12 | 1.6 | A | B | 4.2 | |
| 4 | 10.1 | 1.6 | remainder | | 450 | 5 | 18 | 1.3 | A | B | 2.2 | |
| 5 | 10.3 | 1.8 | remainder | | 450 | 5 | 15 | 1.4 | A | B | 3.0 | |
| 6 | 10.0 | 1.9 | remainder | | 450 | 5 | 12 | 1.5 | A | B | 3.8 | |
| 7 | 9.9 | 1.3 | remainder | | 450 | 2 | 15 | 1.0 | A | B | 2.9 | |
| 8 | 10.2 | 2.2 | remainder | | 450 | 10 | 15 | 1.8 | A | B | 3.1 | |
| 9 | 9.8 | 1.9 | remainder | | 480 | 5 | 18 | 1.5 | A | B | 4.2 | |
| 10 | 10.0 | 2.1 | remainder | | 480 | 5 | 15 | 1.6 | A | B | 4.6 | |
| 11 | 10.2 | 2.3 | remainder | | 480 | 5 | 12 | 1.8 | A | B | 5.0 | |
| 12 | 10.1 | 2.4 | remainder | | 500 | 5 | 18 | 1.8 | A | B | 4.2 | |
| 13 | 9.9 | 2.6 | remainder | | 500 | 5 | 15 | 2.0 | A | B | 4.8 | |

TABLE 1-continued

| Coating No. | Coating composition (mass %) | | | | Bath temperature | Immersion time (s) | Cooling rate (° C./s) | Thickness of alloy layer (μm) | Corrosion resistance | State of alloy layer | Grain size of primary phase (μm) | Remarks |
|---|---|---|---|---|---|---|---|---|---|---|---|---|
| | Al | Si | Fe | Zn | | | | | | | | |
| 14 | 10.0 | | 2.8 | remainder | 500 | 5 | 12 | 2.2 | A | B | 5.2 | |
| 15 | 10.3 | | 2.5 | remainder | 550 | 5 | 18 | 1.9 | A | B | 4.5 | |
| 16 | 9.7 | | 2.7 | remainder | 550 | 5 | 15 | 2.1 | A | C | 4.9 | |
| 17 | 10.1 | | 3.2 | remainder | 550 | 5 | 12 | 2.4 | A | C | 5.5 | |
| 18 | 10.0 | | 3.0 | remainder | 550 | 10 | 15 | 2.3 | A | C | 7.9 | |
| 19 | 12.1 | | 2.1 | remainder | 450 | 5 | 12 | 1.6 | A | B | 3.5 | |
| 20 | 12.0 | | 1.8 | remainder | 450 | 5 | 15 | 1.4 | A | B | 2.9 | |
| 21 | 12.3 | | 2.0 | remainder | 450 | 5 | 18 | 1.2 | A | B | 2.0 | |
| 22 | 11.8 | | 1.1 | remainder | 450 | 3 | 18 | 0.9 | A | B | 1.9 | |
| 23 | 12.0 | | 2.1 | remainder | 450 | 10 | 18 | 1.7 | A | B | 2.3 | |
| 24 | 11.9 | | 2.3 | remainder | 500 | 3 | 18 | 1.8 | A | B | 4.2 | |
| 25 | 12.0 | | 2.5 | remainder | 500 | 5 | 18 | 2.0 | A | B | 4.3 | |
| 26 | 12.2 | | 2.8 | remainder | 500 | 10 | 18 | 2.2 | A | C | 4.2 | |
| 27 | 12.0 | | 3.3 | remainder | 550 | 10 | 15 | 2.5 | A | C | 5.6 | |
| 28 | 15.0 | | 1.9 | remainder | 480 | 5 | 18 | 1.5 | A | B | 4.2 | |
| 29 | 15.2 | | 2.1 | remainder | 480 | 5 | 15 | 1.7 | A | B | 4.5 | |
| 30 | 14.9 | | 2.4 | remainder | 480 | 5 | 12 | 1.8 | A | B | 5.1 | |

TABLE 2

| Coating No. | Coating composition (mass %) | | | | Bath temperature | Immersion time (s) | Cooling rate (° C./s) | Thickness of alloy layer (μm) | Corrosion resistance | State of alloy layer | Grain size of primary phase (μm) | Remarks |
|---|---|---|---|---|---|---|---|---|---|---|---|---|
| | Al | Si | Fe | Zn | | | | | | | | |
| 31 | 14.9 | | 2.3 | remainder | 500 | 3 | 18 | 1.7 | A | B | 3.9 | Examples of the present invention |
| 32 | 15.1 | | 2.5 | remainder | 500 | 5 | 18 | 2.0 | A | B | 4.2 | |
| 33 | 15.0 | | 2.9 | remainder | 500 | 10 | 18 | 2.4 | A | C | 4.1 | |
| 34 | 3.0 | | 1.5 | remainder | 450 | 5 | 18 | 1.2 | C | B | 3.0 | |
| 35 | 3.3 | | 1.7 | remainder | 450 | 5 | 15 | 1.4 | C | B | 2.9 | |
| 36 | 3.1 | | 2.0 | remainder | 450 | 5 | 12 | 1.6 | C | B | 4.0 | |
| 37 | 5.9 | | 1.5 | remainder | 450 | 5 | 18 | 1.2 | B | B | 2.0 | |
| 38 | 6.2 | | 1.8 | remainder | 450 | 5 | 15 | 1.5 | B | B | 3.0 | |
| 39 | 6.0 | | 2.1 | remainder | 450 | 5 | 12 | 1.7 | B | B | 4.3 | |
| 40 | 6.1 | 0.2 | 0.2 | remainder | 450 | 5 | 18 | 0.2 | B | A | 1.9 | |
| 41 | 6.0 | 0.2 | 0.3 | remainder | 450 | 5 | 15 | 0.2 | B | A | 3.1 | |
| 42 | 5.8 | 0.3 | 0.4 | remainder | 450 | 5 | 12 | 0.3 | B | A | 3.8 | |
| 43 | 9.9 | 0.2 | 0.1 | remainder | 450 | 5 | 40 | 0.1 | A | A | 1.0 | |
| 44 | 10.2 | 0.5 | 0.1 | remainder | 450 | 5 | 40 | 0.1 | A | A | 0.9 | |
| 45 | 10.0 | 2.0 | 0.2 | remainder | 450 | 5 | 12 | 0.2 | A | A | 4.0 | |
| 46 | 8.1 | 0.2 | 0.4 | remainder | 430 | 5 | 12 | 0.3 | A | A | 4.1 | |
| 47 | 8.0 | 0.2 | 0.3 | remainder | 430 | 5 | 15 | 0.3 | A | A | 2.9 | |
| 48 | 8.2 | 0.3 | 0.2 | remainder | 430 | 5 | 18 | 0.2 | A | A | 2.0 | |
| 49 | 10.3 | 0.1 | 0.3 | remainder | 450 | 5 | 18 | 0.3 | A | A | 2.1 | |
| 50 | 10.0 | 0.2 | 0.4 | remainder | 450 | 5 | 15 | 0.3 | A | A | 3.0 | |
| 51 | 9.9 | 0.1 | 0.5 | remainder | 450 | 5 | 12 | 0.4 | A | A | 4.0 | |
| 52 | 9.7 | 0.2 | 0.4 | remainder | 450 | 10 | 15 | 0.3 | A | A | 3.1 | |
| 53 | 10.1 | 0.2 | 0.3 | remainder | 450 | 5 | 15 | 0.3 | A | A | 3.0 | |
| 54 | 9.8 | 0.2 | 0.2 | remainder | 450 | 3 | 15 | 0.2 | A | A | 3.0 | |
| 55 | 10.0 | 0.5 | 2.0 | remainder | 550 | 5 | 8 | 1.7 | A | A | 4.5 | |
| 56 | 10.2 | 0.6 | 0.8 | remainder | 500 | 5 | 18 | 0.7 | A | A | 4.2 | |
| 57 | 9.9 | 0.5 | 0.4 | remainder | 480 | 5 | 18 | 0.3 | A | A | 4.0 | |
| 58 | 10.0 | 0.5 | 0.3 | remainder | 450 | 5 | 15 | 0.3 | A | A | 3.0 | |
| 59 | 10.2 | 0.4 | 0.2 | remainder | 450 | 5 | 12 | 0.2 | A | A | 4.1 | |
| 60 | 10.0 | 0.9 | 0.4 | remainder | 480 | 5 | 18 | 0.3 | A | A | 4.0 | |

TABLE 3

| Coating No. | Coating composition (mass %) | | | | Bath temperature | Immersion time (s) | Cooling rate (° C./s) | Thickness of alloy layer (μm) | Corrosion resistance | State of alloy layer | Grain size of primary phase (μm) | Remarks |
|---|---|---|---|---|---|---|---|---|---|---|---|---|
| | Al | Si | Fe | Zn | | | | | | | | |
| 61 | 10.1 | 1.0 | 0.4 | remainder | 480 | 5 | 18 | 0.3 | A | A | 4.0 | Examples |
| 62 | 9.8 | 1.0 | 0.5 | remainder | 480 | 5 | 15 | 0.4 | A | A | 4.5 | of the |
| 63 | 10.0 | 1.1 | 0.7 | remainder | 480 | 5 | 12 | 0.7 | A | A | 5.0 | present |
| 64 | 10.2 | 1.5 | 0.4 | remainder | 480 | 5 | 18 | 0.3 | A | A | 4.1 | invention |
| 65 | 11.8 | 0.2 | 0.3 | remainder | 450 | 5 | 18 | 0.3 | A | A | 2.0 | |
| 66 | 12.1 | 0.3 | 0.2 | remainder | 450 | 5 | 15 | 0.2 | A | A | 2.9 | |
| 67 | 12.3 | 0.2 | 0.1 | remainder | 450 | 5 | 12 | 0.1 | A | A | 4.0 | |
| 68 | 12.0 | 0.6 | 0.3 | remainder | 480 | 5 | 18 | 0.3 | A | A | 3.9 | |
| 69 | 11.9 | 0.5 | 0.8 | remainder | 500 | 5 | 18 | 0.7 | A | A | 4.2 | |
| 70 | 12.2 | 0.5 | 2.0 | remainder | 550 | 5 | 8 | 1.7 | A | A | 4.5 | |
| 71 | 12.0 | 1.0 | 0.6 | remainder | 500 | 15 | 18 | 0.4 | A | A | 4.3 | |
| 72 | 12.1 | 1.1 | 0.4 | remainder | 500 | 10 | 18 | 0.3 | A | A | 4.1 | |
| 73 | 12.0 | 1.0 | 0.2 | remainder | 500 | 3 | 18 | 0.2 | A | A | 4.2 | |
| 74 | 14.9 | 0.2 | 0.2 | remainder | 480 | 5 | 18 | 0.2 | A | A | 3.9 | |
| 75 | 15.0 | 0.3 | 0.3 | remainder | 480 | 5 | 15 | 0.3 | A | A | 4.6 | |
| 76 | 15.2 | 0.2 | 0.5 | remainder | 480 | 5 | 12 | 0.4 | A | A | 4.9 | |
| 77 | | | | remainder | 450 | 1 | 18 | — | D | D | — | Comparative |
| 78 | | | 2.1 | remainder | 460 | 5 | 15 | 2.5 | D | D | — | tive |
| 79 | | | 5.2 | remainder | 500 | 5 | 15 | 2.6 | D | D | — | Examples |
| 80 | | | 9.9 | remainder | 550 | 5 | 15 | 2.5 | D | D | — | |
| 81 | 2.0 | | 1.5 | remainder | 430 | 5 | 15 | 1.2 | D | C | 3.0 | |
| 82 | 2.1 | | 1.8 | remainder | 430 | 5 | 18 | 1.4 | D | C | 2.0 | |
| 83 | 2.2 | 0.2 | 0.4 | remainder | 430 | 5 | 18 | 0.3 | D | A | 2.3 | |
| 84 | 10.0 | | 7.9 | remainder | 550 | 20 | 8 | 6.0 | A | C | 19.8 | |
| 85 | 10.2 | 0.2 | 1.5 | remainder | 550 | 5 | 5 | 1.2 | A | A | 20.1 | |
| 86 | 12.0 | | 4.0 | remainder | 460 | 5 | 18 | 10.4 | A | D | 2.0 | |
| 87 | 11.0 | | 4.1 | remainder | 460 | 5 | 18 | 10.6 | A | D | 2.1 | |
| 88 | 12.1 | | 5.2 | remainder | 460 | 5 | 18 | 12.6 | A | D | 2.0 | |
| 89 | 12.0 | | 5.6 | remainder | 460 | 5 | 18 | 12.5 | A | D | 1.9 | |
| 90 | 11.8 | 0.3 | 5.4 | remainder | 460 | 5 | 18 | 12.0 | A | D | 2.2 | |
| 91 | 11.7 | 0.3 | 5.5 | remainder | 460 | 5 | 18 | 12.1 | A | D | 2.0 | |

TABLE 4

| Steel No. | Chemical components (mass %) | | | | | | | | | | | | | | | |
|---|---|---|---|---|---|---|---|---|---|---|---|---|---|---|---|---|
| | C | Si | Mn | P | S | Al | N | Cr | Mo | V | Ni | Cu | B | Ti | Nb | Zr |
| A | 0.77 | 0.22 | 0.78 | 0.006 | 0.008 | 0.031 | 0.0045 | — | — | — | — | — | — | — | — | — |
| B | 0.93 | 0.19 | 0.31 | 0.012 | 0.005 | 0.025 | 0.0039 | — | — | — | — | — | — | — | — | — |
| C | 0.81 | 0.49 | 0.64 | 0.005 | 0.006 | 0.032 | 0.0056 | — | — | — | — | — | — | — | — | — |
| D | 0.88 | 0.12 | 0.45 | 0.001 | 0.004 | — | 0.0040 | — | — | — | — | — | — | — | — | — |
| E | 0.72 | 0.34 | 1.19 | 0.006 | 0.004 | 0.028 | 0.0023 | — | — | — | — | — | — | — | — | — |
| F | 0.79 | 0.14 | 0.97 | 0.002 | 0.009 | 0.019 | 0.0045 | 0.12 | — | — | — | — | — | — | — | — |
| G | 0.84 | 0.33 | 0.65 | 0.007 | 0.008 | 0.003 | 0.0029 | — | 0.07 | — | — | — | — | — | — | — |
| H | 0.80 | 0.20 | 0.33 | 0.006 | 0.007 | 0.022 | 0.0027 | — | — | — | 0.09 | — | — | — | — | — |
| I | 0.76 | 0.36 | 0.75 | 0.008 | 0.006 | 0.012 | 0.0041 | — | — | — | 0.34 | 0.08 | — | — | — | — |
| J | 0.74 | 0.24 | 0.29 | 0.007 | 0.009 | 0.054 | 0.0051 | — | — | — | — | — | 0.0020 | — | — | — |
| K | 0.89 | 0.31 | 0.88 | 0.006 | 0.007 | 0.009 | 0.0020 | — | — | — | — | — | 0.0018 | 0.011 | — | — |
| L | 0.84 | 0.21 | 0.94 | 0.008 | 0.009 | 0.028 | 0.0048 | — | — | — | — | — | — | — | 0.013 | — |
| M | 0.77 | 0.28 | 0.93 | 0.007 | 0.009 | 0.035 | 0.0038 | — | — | — | — | — | — | — | — | 0.008 |
| N | 0.74 | 0.29 | 0.70 | 0.006 | 0.007 | 0.026 | 0.0047 | 0.36 | — | — | — | — | 0.0015 | 0.008 | — | — |
| O | 0.66 | 0.26 | 0.49 | 0.006 | 0.009 | 0.043 | 0.0041 | — | — | — | — | — | — | — | — | — |
| P | 0.93 | 0.44 | <u>1.79</u> | 0.008 | 0.007 | 0.015 | 0.0032 | — | — | — | — | — | — | — | — | — |
| Q | 0.76 | 0.18 | 0.72 | 0.006 | 0.005 | 0.034 | 0.0029 | 0.08 | — | 0.07 | — | — | — | — | — | — |

TABLE 5

| Test No. | Steel No. | Patenting temperature (°C.) | Coating method | Coating composition (mass %) | | | | Wire diameter after coating | Wire-drawn pearlite (%) | Grain size of primary phase (μm) | Thickness of alloy layer (μm) | Remarks |
|---|---|---|---|---|---|---|---|---|---|---|---|---|
| | | | | Al | Si | Fe | Zn | | | | | |
| 1 | A | 525 | 1-bath Zn—Al | 3.2 | | 1.6 | remainder | 5.0 | 97 | 2.6 | 1.3 | Examples of the present invention |
| 2 | A | 525 | 1-bath Zn—Al | 6.5 | | 1.5 | remainder | 5.0 | 97 | 2.2 | 1.2 | |
| 3 | B | 540 | 1-bath Zn—Al | 6.5 | 0.2 | 0.3 | remainder | 7.0 | 99 | 3.2 | 0.2 | |
| 4 | B | 555 | 1-bath Zn—Al | 8.1 | | 2.0 | remainder | 7.0 | 99 | 4.1 | 1.7 | |
| 5 | C | 545 | 1-bath Zn—Al | 8.3 | 0.2 | 0.4 | remainder | 5.4 | 98 | 2.1 | 0.3 | |
| 6 | C | 545 | 1-bath Zn—Al | 10.5 | | 3.0 | remainder | 7.2 | 99 | 5.2 | 2.4 | |
| 7 | D | 550 | 1-bath Zn—Al | 10.8 | 1.0 | 0.8 | remainder | 4.5 | 98 | 5.0 | 0.7 | |
| 8 | D | 530 | 1-bath Zn—Al | 10.4 | 0.5 | 0.9 | remainder | 5.0 | 97 | 4.2 | 0.7 | |
| 9 | E | 530 | 1-bath Zn—Al | 9.2 | 0.1 | 0.4 | remainder | 5.2 | 96 | 3.0 | 0.3 | |
| 10 | E | 530 | 1-bath Zn—Al | 13.8 | 1.0 | 0.5 | remainder | 5.2 | 96 | 4.2 | 0.4 | |
| 11 | F | 565 | 1-bath Zn—Al | 10.6 | | 1.4 | remainder | 7.0 | 96 | 2.0 | 1.1 | |
| 12 | F | 560 | 1-bath Zn—Al | 12.7 | 0.9 | 0.2 | remainder | 7.0 | 96 | 4.2 | 0.2 | |
| 13 | G | 545 | 1-bath Zn—Al | 10.8 | 1.0 | 0.7 | remainder | 7.0 | 98 | 4.9 | 0.6 | |
| 14 | G | 540 | 1-bath Zn—Al | 13.0 | 1.1 | 0.5 | remainder | 7.0 | 98 | 4.2 | 0.4 | |
| 15 | H | 570 | 1-bath Zn—Al | 11.0 | 0.8 | 0.4 | remainder | 5.2 | 98 | 4.0 | 0.3 | |
| 16 | H | 560 | 1-bath Zn—Al | 11.9 | 1.0 | 0.6 | remainder | 7.0 | 97 | 4.5 | 0.5 | |
| 17 | I | 550 | 1-bath Zn—Al | 12.2 | 1.1 | 0.5 | remainder | 5.2 | 98 | 4.3 | 0.4 | |
| 18 | I | 550 | 1-bath Zn—Al | 10.3 | 0.2 | 0.3 | remainder | 5.2 | 98 | 2.0 | 0.3 | |
| 19 | J | 535 | 1-bath Zn—Al | 14.6 | 0.2 | 0.4 | remainder | 7.4 | 95 | 2.1 | 0.3 | |
| 20 | J | 535 | 1-bath Zn—Al | 10.5 | 0.9 | 0.8 | remainder | 7.4 | 96 | 5.1 | 0.7 | |
| 21 | K | 550 | 1-bath Zn—Al | 9.8 | 1.0 | 0.7 | remainder | 5.4 | 99 | 4.9 | 0.6 | |
| 22 | K | 540 | 1-bath Zn—Al | 12.2 | 1.1 | 0.5 | remainder | 5.0 | 98 | 4.2 | 0.4 | |
| 23 | L | 535 | 1-bath Zn—Al | 10.8 | 1.0 | 0.9 | remainder | 5.0 | 98 | 5.2 | 0.8 | |

TABLE 6

| Test No. | Steel No. | Patenting temperature (°C.) | Coating method | Coating composition (mass %) | | | | Wire diameter after coating | Wire-drawn pearlite (%) | Grain size of primary phase (μm) | Thickness of alloy layer (μm) | Remarks |
|---|---|---|---|---|---|---|---|---|---|---|---|---|
| | | | | Al | Si | Fe | Zn | | | | | |
| 24 | L | 535 | 1-bath Zn—Al | 14.1 | | 1.9 | remainder | 5.0 | 98 | 3.2 | 1.5 | Examples of the present invention |
| 25 | M | 550 | 1-bath Zn—Al | 10.9 | | 1.5 | remainder | 5.0 | 97 | 2.0 | 1.2 | |
| 26 | M | 550 | 1-bath Zn—Al | 10.5 | 0.2 | 0.3 | remainder | 6.0 | 97 | 3.1 | 0.3 | |
| 27 | M | 550 | 1-bath Zn—Al | 10.5 | 1.0 | 0.9 | remainder | 7.0 | 97 | 4.9 | 0.7 | |
| 28 | M | 550 | 1-bath Zn—Al | 13.0 | | 1.1 | remainder | 5.0 | 97 | 2.1 | 0.9 | |
| 29 | N | 585 | 1-bath Zn—Al | 11.6 | | 2.0 | remainder | 7.0 | 97 | 4.0 | 1.6 | |
| 30 | N | 580 | 1-bath Zn—Al | 12.7 | 0.5 | 0.8 | remainder | 7.0 | 98 | 4.2 | 0.7 | |
| 31 | Q | 540 | 1-bath Zn—Al | 11.2 | | 1.8 | remainder | 5.2 | 96 | 3.0 | 1.4 | |
| 32 | Q | 545 | 1-bath Zn—Al | 10.1 | 0.2 | 0.3 | remainder | 5.2 | 96 | 3.1 | 0.3 | |
| 33 | A | 525 | Zn | | | | remainder | 5.0 | 97 | — | 2.8 | Comparative Examples |
| 34 | D | 550 | Zn | | | | remainder | 4.5 | 98 | — | 2.7 | |
| 35 | F | 565 | Zn | | | | remainder | 7.0 | 96 | — | 2.9 | |
| 36 | J | 535 | Zn | | | | remainder | 7.4 | 95 | — | 2.8 | |
| 37 | L | 535 | Zn | | | | remainder | 5.0 | 98 | — | 2.7 | |
| 38 | Q | 540 | Zn | | | | remainder | 5.2 | 96 | — | 2.8 | |
| 39 | O | 540 | 1-bath Zn—Al | 10.3 | | 8.0 | remainder | 7.0 | 91 | 17.9 | 6.0 | |
| 40 | P | 520 | 1-bath Zn—Al | 10.5 | 0.2 | 1.4 | remainder | 5.0 | 89 | 20.0 | 1.2 | |
| 41 | J | 635 | 1-bath Zn—Al | 11.0 | 0.2 | 1.5 | remainder | 7.4 | 96 | 20.2 | 1.2 | |
| 42 | N | 485 | 1-bath Zn—Al | 12.0 | | 8.1 | remainder | 5.2 | 86 | 18.1 | 6.2 | |
| 43 | B | 540 | 2-bath Zn—Al | 10.7 | | 8.2 | remainder | 7.0 | 99 | 3.5 | 5.2 | |
| 44 | C | 545 | 2-bath Zn—Al | 10.8 | | 10.3 | remainder | 5.4 | 98 | 3.4 | 6.6 | |
| 45 | E | 530 | 2-bath Zn—Al | 10.7 | 0.5 | 10.5 | remainder | 5.2 | 96 | 3.6 | 6.0 | |
| 46 | I | 550 | 2-bath Zn—Al | 10.8 | 0.5 | 10.4 | remainder | 5.2 | 98 | 3.5 | 8.4 | |

TABLE 7

| Test No. | Steel No. | Corrosion resistance | State of alloy layer | Tensile strength (MPa) | Torsion number (n) | Fatigue limit (MPa) | Fatigue limit/tensile strength | Remarks |
|---|---|---|---|---|---|---|---|---|
| 1 | A | C | B | 1687 | 24 | 458 | 0.27 | Examples of the present invention |
| 2 | A | B | B | 1688 | 24 | 460 | 0.27 | |
| 3 | B | B | A | 1784 | 24 | 492 | 0.28 | |
| 4 | B | B | B | 1760 | 26 | 522 | 0.30 | |
| 5 | C | B | A | 1741 | 25 | 483 | 0.28 | |
| 6 | C | A | B | 1732 | 25 | 472 | 0.27 | |
| 7 | D | A | A | 1580 | 27 | 429 | 0.27 | |

TABLE 7-continued

| Test No. | Steel No. | Corrosion resistance | State of alloy layer | Tensile strength (MPa) | Torsion number (n) | Fatigue limit (MPa) | Fatigue limit/tensile strength | Remarks |
|---|---|---|---|---|---|---|---|---|
| 8 | D | A | A | 1624 | 25 | 465 | 0.29 | |
| 9 | E | A | A | 1730 | 24 | 496 | 0.29 | |
| 10 | E | A | A | 1736 | 26 | 493 | 0.28 | |
| 11 | F | A | B | 1699 | 26 | 503 | 0.30 | |
| 12 | F | A | A | 1712 | 24 | 490 | 0.29 | |
| 13 | G | A | A | 1732 | 23 | 492 | 0.28 | |
| 14 | G | A | A | 1746 | 25 | 496 | 0.28 | |
| 15 | H | A | A | 1740 | 28 | 535 | 0.31 | |
| 16 | H | A | A | 1752 | 26 | 530 | 0.30 | |
| 17 | I | A | A | 1651 | 27 | 420 | 0.25 | |
| 18 | I | A | A | 1642 | 26 | 452 | 0.28 | |
| 19 | J | A | A | 1630 | 26 | 456 | 0.28 | |
| 20 | J | A | A | 1632 | 25 | 484 | 0.30 | |
| 21 | K | A | A | 1613 | 24 | 445 | 0.28 | |
| 22 | K | A | A | 1639 | 26 | 474 | 0.29 | |
| 23 | L | A | A | 1705 | 25 | 473 | 0.28 | |

TABLE 8

| Test No. | Steel No. | Corrosion resistance | State of alloy layer | Tensile strength (MPa) | Torsion number (n) | Fatigue limit (MPa) | Fatigue limit/tensile strength | Remarks |
|---|---|---|---|---|---|---|---|---|
| 24 | L | A | B | 1709 | 28 | 470 | 0.28 | Examples of the present invention |
| 25 | M | A | B | 1670 | 25 | 455 | 0.27 | |
| 26 | M | A | A | 1666 | 27 | 468 | 0.28 | |
| 27 | M | A | A | 1672 | 26 | 481 | 0.29 | |
| 28 | M | A | B | 1678 | 29 | 451 | 0.27 | |
| 29 | N | A | B | 1739 | 26 | 494 | 0.28 | |
| 30 | N | A | A | 1704 | 27 | 487 | 0.29 | |
| 31 | Q | A | B | 1720 | 27 | 469 | 0.27 | |
| 32 | Q | A | A | 1758 | 26 | 485 | 0.28 | |
| 33 | A | D | D | 1679 | 25 | 457 | 0.27 | Comparative Examples |
| 34 | D | D | D | 1583 | 24 | 385 | 0.24 | |
| 35 | F | D | D | 1696 | 26 | 445 | 0.26 | |
| 36 | J | D | D | 1630 | 27 | 450 | 0.28 | |
| 37 | L | D | D | 1707 | 28 | 465 | 0.27 | |
| 38 | Q | D | D | 1716 | 23 | 458 | 0.27 | |
| 39 | O | C | C | 1478 | 26 | 371 | 0.25 | |
| 40 | P | A | A | 1790 | 15 | 380 | 0.21 | |
| 41 | J | A | A | 1494 | 22 | 341 | 0.23 | |
| 42 | N | C | C | 1785 | 8 | 365 | 0.20 | |
| 43 | B | A | D | 1759 | 22 | 312 | 0.18 | |
| 44 | C | A | D | 1721 | 22 | 290 | 0.17 | |
| 45 | E | A | D | 1698 | 21 | 276 | 0.16 | |
| 46 | I | A | D | 1635 | 22 | 280 | 0.17 | |

TABLE 9

| Steel No. | Chemical composition (mass %) | | | | | | | | | | | | | | | | Remarks |
|---|---|---|---|---|---|---|---|---|---|---|---|---|---|---|---|---|---|
| | C | Si | Mn | P | S | Al | N | Cr | Mo | V | Ni | Cu | B | Ti | Nb | Zr | |
| A' | 0.82 | 0.95 | 0.81 | 0.011 | 0.007 | 0.026 | 0.0035 | — | — | — | — | — | — | — | — | — | Examples of the present invention |
| B' | 0.88 | 1.15 | 0.47 | 0.006 | 0.005 | 0.037 | 0.0031 | 0.32 | — | — | — | — | — | — | — | — | |
| C' | 0.88 | 1.02 | 0.84 | 0.003 | 0.007 | 0.029 | 0.0037 | — | — | — | — | — | 0.0016 | 0.009 | — | — | |
| D' | 0.81 | 0.66 | 0.71 | 0.009 | 0.009 | 0.024 | 0.0023 | 0.11 | — | 0.07 | — | — | — | — | — | — | |
| E' | 0.98 | 0.85 | 0.36 | 0.008 | 0.008 | 0.004 | 0.0041 | — | — | — | — | — | — | — | — | — | |
| F' | 0.94 | 0.99 | 0.64 | 0.005 | 0.004 | 0.031 | 0.0027 | — | — | — | — | — | — | — | 0.020 | — | |
| G' | 0.92 | 1.23 | 0.39 | 0.004 | 0.006 | 0.030 | 0.0036 | — | — | — | — | — | — | — | — | 0.009 | |
| H' | 0.87 | 0.79 | 0.34 | 0.008 | 0.009 | 0.019 | 0.0041 | — | 0.12 | — | — | — | — | — | — | — | |
| I' | 0.83 | 1.40 | 0.54 | 0.007 | 0.010 | 0.025 | 0.0056 | — | — | — | — | — | — | — | — | — | |
| J' | 0.85 | 1.07 | 0.77 | 0.007 | 0.007 | 0.030 | 0.0022 | — | — | — | 0.34 | 0.19 | — | — | — | — | |
| K' | 0.86 | 1.31 | 0.65 | 0.009 | 0.008 | — | 0.0050 | — | — | — | — | — | 0.0019 | 0.018 | — | — | |
| L' | 0.83 | 1.27 | 1.06 | 0.006 | 0.007 | 0.032 | 0.0034 | — | — | — | — | — | — | — | — | — | |
| M' | 0.96 | 0.93 | 0.78 | 0.005 | 0.006 | 0.025 | 0.0045 | — | — | — | — | — | — | — | — | — | |
| N' | 0.82 | 1.06 | 0.63 | 0.010 | 0.008 | 0.044 | 0.0039 | 0.12 | — | — | — | — | 0.0020 | 0.020 | — | — | |
| O' | 0.90 | 0.89 | 0.50 | 0.005 | 0.010 | 0.034 | 0.0036 | 0.07 | 0.06 | — | — | — | 0.0019 | 0.014 | — | — | |
| P' | 0.77 | 0.22 | 0.78 | 0.006 | 0.008 | 0.031 | 0.0045 | — | — | — | — | — | — | — | — | — | Compar- |

TABLE 9-continued

| Steel No. | Chemical composition (mass %) | | | | | | | | | | | | | | | | Remarks |
|---|---|---|---|---|---|---|---|---|---|---|---|---|---|---|---|---|---|
| | C | Si | Mn | P | S | Al | N | Cr | Mo | V | Ni | Cu | B | Ti | Nb | Zr | |
| Q' | 0.83 | 0.19 | 0.82 | 0.009 | 0.008 | 0.019 | 0.0033 | — | — | — | — | — | — | — | — | — | ative |
| R' | 0.83 | 1.02 | 1.84 | 0.006 | 0.005 | 0.035 | 0.0029 | — | — | — | — | — | — | — | — | — | Examples |

TABLE 10

| Wire rod No. | Steel No. | Patenting temperature (° C.) | Pearlite Fraction (%) | Cementite thickness (μm) | 0.027 × C % (μm) | Tensile strength (MPa) | Difference in tensile strength (MPa) | Remarks |
|---|---|---|---|---|---|---|---|---|
| A1' | A' | 545 | 97 | 0.012 | 0.022 | 1261 | 17 | Example |
| B1' | B' | 580 | 96 | 0.011 | 0.024 | 1419 | 32 | of the |
| C1' | C' | 555 | 99 | 0.013 | 0.024 | 1347 | 25 | present |
| D1' | D' | 560 | 98 | 0.014 | 0.022 | 1330 | 31 | invention |
| E1' | E' | 550 | 99 | 0.016 | 0.026 | 1443 | 34 | |
| F1' | F' | 570 | 98 | 0.014 | 0.025 | 1410 | 26 | |
| G1' | G' | 560 | 97 | 0.015 | 0.025 | 1421 | 20 | |
| H1' | H' | 575 | 97 | 0.013 | 0.023 | 1395 | 18 | |
| I1' | I' | 540 | 96 | 0.013 | 0.022 | 1298 | 17 | |
| J1' | J' | 585 | 97 | 0.014 | 0.023 | 1324 | 23 | |
| K1' | K' | 550 | 99 | 0.013 | 0.023 | 1339 | 21 | |
| K2' | K' | 575 | 99 | 0.013 | 0.024 | 1420 | 25 | |
| L1' | L' | 570 | 97 | 0.015 | 0.022 | 1274 | 19 | |
| M1' | M' | 565 | 98 | 0.014 | 0.026 | 1486 | 31 | |
| N1' | N' | 545 | 98 | 0.011 | 0.022 | 1315 | 28 | |
| O1' | O' | 575 | 99 | 0.013 | 0.024 | 1420 | 25 | |
| O2' | O' | 550 | 99 | 0.013 | 0.023 | 1339 | 21 | |
| P1' | P' | 525 | 97 | 0.014 | 0.021 | 1212 | 21 | Comparative |
| Q1' | Q' | 550 | 96 | 0.013 | 0.022 | 1257 | 23 | Example |
| R1' | R' | 535 | 89 | 0.014 | 0.022 | 1286 | 96 | |
| A2' | A' | air-cooling | 94 | 0.026 | 0.022 | 1204 | 90 | |
| B2' | B' | air-cooling | 95 | 0.027 | 0.024 | 1280 | 103 | |
| B3' | B' | 495 | 86 | 0.010 | 0.024 | 1449 | 42 | |
| E2' | E' | 640 | 99 | 0.033 | 0.026 | 1232 | 29 | |
| M2' | M' | air-cooling | 98 | 0.031 | 0.026 | 1266 | 124 | |

TABLE 11

| Test No. | Steel No. | Wire rod No. | Drawing temperature (° C.) | Roller-straightening | Heating (° C. × sec) | Coating method | Coating composition (mass %) | | | | Remarks |
|---|---|---|---|---|---|---|---|---|---|---|---|
| | | | | | | | Al | Si | Fe | Zn | |
| 1' | A' | A1' | 178 | — | — | 1-bath Zn—Al | 3.1 | | 1.9 | Remainder | Example of |
| 2' | A' | A1' | 178 | — | — | 1-bath Zn—Al | 6.0 | | 1.5 | Remainder | the present |
| 3' | A' | A1' | 178 | — | — | 1-bath Zn—Al | 6.1 | | 2.4 | Remainder | invention |
| 4' | A' | A1' | 178 | — | — | 1-bath Zn—Al | 6.2 | 0.4 | 0.5 | Remainder | |
| 5' | A' | A1' | 178 | — | — | 1-bath Zn—Al | 8.5 | | 2.1 | Remainder | |
| 6' | A' | A1' | 178 | — | — | 1-bath Zn—Al | 8.6 | 0.2 | 0.3 | Remainder | |
| 7' | A' | A1' | 178 | — | — | 1-bath Zn—Al | 10.5 | | 1.9 | Remainder | |
| 8' | A' | A1' | 178 | — | — | 1-bath Zn—Al | 10.4 | 1.1 | 0.4 | Remainder | |
| 9' | A' | A1' | 178 | — | — | 1-bath Zn—Al | 12.1 | | 2.2 | Remainder | |
| 10' | A' | A1' | 178 | — | — | 1-bath Zn—Al | 11.9 | 0.5 | 0.8 | Remainder | |
| 11' | A' | A1' | 178 | — | — | 1-bath Zn—Al | 14.8 | | 2.3 | Remainder | |
| 12' | A' | A1' | 178 | — | — | 1-bath Zn—Al | 15.1 | 0.3 | 0.3 | Remainder | |
| 13' | A' | A1' | 178 | Present | — | 1-bath Zn—Al | 10.6 | 0.5 | 0.2 | Remainder | |
| 14' | A' | A1' | 178 | — | 475 × 5 | 1-bath Zn—Al | 10.3 | 1.6 | 0.4 | Remainder | |
| 15' | B' | B1' | 165 | Present | — | 1-bath Zn—Al | 10.2 | | 2.5 | Remainder | |
| 16' | B' | B1' | 165 | — | — | 1-bath Zn—Al | 10.5 | | 2.4 | Remainder | |
| 17' | B' | B1' | 165 | — | 450 × 7 | 1-bath Zn—Al | 10.5 | | 2.5 | Remainder | |
| 18' | C' | C1' | 148 | — | 445 × 10 | 1-bath Zn—Al | 10.7 | 0.5 | 0.8 | Remainder | |
| 19' | C' | C1' | 148 | Present | — | 1-bath Zn—Al | 10.3 | 0.3 | 0.8 | Remainder | |
| 20' | C' | C1' | 148 | — | — | 1-bath Zn—Al | 10.6 | 0.6 | 0.9 | Remainder | |
| 21' | D' | D1' | 176 | — | — | 1-bath Zn—Al | 10.2 | | 1.6 | Remainder | |
| 22' | D' | D1' | 176 | — | — | 1-bath Zn—Al | 10.4 | 0.1 | 0.4 | Remainder | |
| 23' | E' | E1' | 172 | — | — | 1-bath Zn—Al | 10.5 | 0.3 | 0.3 | Remainder | |
| 24' | E' | E1' | 172 | Present | — | 1-bath Zn—Al | 10.3 | 0.2 | 0.2 | Remainder | |
| 25' | F' | F1' | 175 | — | — | 1-bath Zn—Al | 10.5 | | 2.3 | Remainder | |
| 26' | F' | F1' | 175 | — | — | 1-bath Zn—Al | 10.6 | 0.5 | 0.3 | Remainder | |

TABLE 12

| Test No. | Steel No. | Wire rod No. | Drawing temperature (° C.) | Roller-straightening | Heating (° C. × sec) | Coating method | Coating composition (mass %) Al | Si | Fe | Zn | Remarks |
|---|---|---|---|---|---|---|---|---|---|---|---|
| 27' | G' | G1' | 169 | Present | 450 × 15 | 1-bath Zn—Al | 10.4 | 0.6 | 0.4 | Remainder | Example of |
| 28' | G' | G1' | 169 | — | — | 1-bath Zn—Al | 10.5 | 0.4 | 0.3 | Remainder | the present |
| 29' | H' | H1' | 172 | — | — | 1-bath Zn—Al | 10.6 | | 2.8 | Remainder | invention |
| 30' | H' | H1' | 172 | — | 430 × 40 | 1-bath Zn—Al | 10.3 | | 3.0 | Remainder | |
| 31' | I' | I1' | 169 | — | — | 1-bath Zn—Al | 10.5 | | 2.9 | Remainder | |
| 32' | I' | I1' | 169 | — | — | 1-bath Zn—Al | 10.5 | 0.3 | 0.3 | Remainder | |
| 33' | J' | J1' | 174 | — | — | 1-bath Zn—Al | 10.2 | | 2.4 | Remainder | |
| 34' | J' | J1' | 174 | Present | 455 × 5 | 1-bath Zn—Al | 10.5 | 0.2 | 0.3 | Remainder | |
| 35' | K' | K1' | 177 | — | — | 1-bath Zn—Al | 10.6 | | 2.6 | Remainder | |
| 36' | K' | K1' | 177 | — | — | 1-bath Zn—Al | 10.5 | 1.1 | 0.4 | Remainder | |
| 37' | K' | K1' | 177 | Present | 460 × 2 | 1-bath Zn—Al | 10.4 | 0.9 | 0.6 | Remainder | |
| 38' | L' | L1' | 196 | — | — | 1-bath Zn—Al | 10.5 | | 2.5 | Remainder | |
| 39' | L' | L1' | 196 | — | — | 1-bath Zn—Al | 10.7 | 0.5 | 0.2 | Remainder | |
| 40' | L' | L1' | 196 | Present | 440 × 8 | 1-bath Zn—Al | 10.3 | 0.4 | 0.3 | Remainder | |
| 41' | M' | M1' | 174 | — | — | 1-bath Zn—Al | 10.5 | | 3.0 | Remainder | |
| 42' | M' | M1' | 174 | — | — | 1-bath Zn—Al | 10.2 | 0.3 | 0.9 | Remainder | |
| 43' | N' | N1' | 173 | — | — | 1-bath Zn—Al | 8.6 | | 3.2 | Remainder | |
| 44' | N' | N1' | 173 | — | — | 1-bath Zn—Al | 8.5 | | 1.2 | Remainder | |
| 45' | O' | O1' | 168 | Present | — | 1-bath Zn—Al | 11.3 | | 2.3 | Remainder | |
| 46' | O' | O1' | 168 | — | — | 1-bath Zn—Al | 11.2 | | 2.4 | Remainder | |
| 47' | O' | O1' | 168 | — | 480 × 5 | 1-bath Zn—Al | 11.5 | | 2.4 | Remainder | |

TABLE 13

| Test No. | Steel No. | Wire rod No. | Drawing temperature (° C.) | Roller-straightening | Heating (° C. × sec) | Coating method | Coating composition (mass %) Al | Si | Fe | Zn | Remarks |
|---|---|---|---|---|---|---|---|---|---|---|---|
| 48' | P' | P1' | 156 | — | — | 1-bath Zn—Al | 6.4 | | 2.0 | Remainder | Comparative |
| 49' | Q' | Q1' | 172 | — | — | 1-bath Zn—Al | 10.5 | | 2.1 | Remainder | Example |
| 50' | R' | R1' | 185 | — | — | 1-bath Zn—Al | 10.4 | | 2.2 | Remainder | |
| 51' | A' | A2' | 170 | — | — | 1-bath Zn—Al | 10.4 | | 1.9 | Remainder | |
| 52' | B' | B2' | 178 | — | — | 1-bath Zn—Al | 10.6 | | 2.0 | Remainder | |
| 53' | B' | B3' | 180 | — | — | 1-bath Zn—Al | 10.5 | | 1.8 | Remainder | |
| 54' | E' | E2' | 179 | — | 450 × 10 | 1-bath Zn—Al | 10.7 | | 2.0 | Remainder | |
| 55' | M' | M2' | 187 | Present | — | 1-bath Zn—Al | 10.5 | | 2.1 | Remainder | |
| 56' | H' | H1' | 260 | — | — | 1-bath Zn—Al | 10.6 | | 2.0 | Remainder | |
| 57' | O' | O2' | 285 | Present | 470 × 5 | 1-bath Zn—Al | 10.5 | | 2.1 | Remainder | |
| 58' | K' | K2' | 255 | — | — | 1-bath Zn—Al | 10.4 | | 1.9 | Remainder | |
| 59' | N' | N1' | 173 | — | 525 × 15 | 1-bath Zn—Al | 10.5 | | 2.2 | Remainder | |
| 60' | D' | D1' | 176 | — | 480 × 120 | 1-bath Zn—Al | 10.4 | | 1.8 | Remainder | |
| 61' | I' | I1' | 169 | — | — | 1-bath Zn—Al | 2.7 | 0.3 | 0.5 | Remainder | |
| 62' | J' | J1' | 174 | — | — | 1-bath Zn—Al | 2.9 | | 2.1 | Remainder | |
| 63' | K' | K1' | 177 | Present | 460 × 2 | 1-bath Zn—Al | 10.9 | 2.9 | 0.5 | Remainder | |
| 64' | O' | O1' | 168 | Present | — | 1-bath Zn—Al | 12.3 | | 8.5 | Remainder | |
| 65' | O' | O1' | 168 | Present | — | 1-bath Zn—Al | 2.9 | 3.1 | 0.3 | Remainder | |
| 66' | A' | A1' | 156 | — | — | Zn | | | 3.5 | Remainder | |
| 67' | C' | C1' | 148 | Present | — | Zn | | | 4.0 | Remainder | |
| 68' | G' | G1' | 169 | Present | 450 × 15 | Zn | | | 3.8 | Remainder | |
| 69' | F' | F1' | 175 | — | — | 2-bath Zn—Al | 12.4 | | 4.8 | Remainder | |
| 70' | J' | J1' | 174 | — | — | 2-bath Zn—Al | 12.5 | 0.3 | 5.2 | Remainder | |
| 71' | L' | L1' | 196 | Present | 440 × 8 | 2-bath Zn—Al | 12.6 | | 5.5 | Remainder | |
| 72' | M' | M1' | 174 | — | — | 2-bath Zn—Al | 12.5 | 0.3 | 5.3 | Remainder | |

TABLE 14

| Test No. | Steel No. | Wire rod No. | Wire diameter | Grain size of primary phase (μm) | Thickness of alloy layer (μm) | State of alloy layer | Corrosion resistance | Tensile strength (MPa) | Torsion performance | Fatigue limit (MPa) | Fatigue limit/Tensile strength | Remarks |
|---|---|---|---|---|---|---|---|---|---|---|---|---|
| 1' | A' | A1' | 5.2 | 4.1 | 1.5 | B | C | 1860 | 24 | 526 | 0.28 | Examples of |
| 2' | A' | A1' | 5.2 | 2.8 | 1.2 | B | B | 1861 | 24 | 538 | 0.29 | the present |
| 3' | A' | A1' | 5.2 | 4.8 | 2.0 | C | B | 1859 | 23 | 510 | 0.27 | invention |
| 4' | A' | A1' | 5.2 | 4.3 | 0.4 | A | B | 1862 | 24 | 556 | 0.30 | |
| 5' | A' | A1' | 5.2 | 4.2 | 1.7 | B | A | 1863 | 24 | 521 | 0.28 | |
| 6' | A' | A1' | 5.2 | 2.8 | 0.3 | A | A | 1862 | 23 | 559 | 0.30 | |
| 7' | A' | A1' | 5.2 | 2.4 | 1.3 | B | A | 1860 | 23 | 534 | 0.29 | |
| 8' | A' | A1' | 5.2 | 3.9 | 0.3 | A | A | 1861 | 23 | 552 | 0.30 | |
| 9' | A' | A1' | 5.2 | 4.0 | 1.9 | B | A | 1862 | 24 | 519 | 0.28 | |

TABLE 14-continued

| Test No. | Steel No. | Wire rod No. | Wire diameter | Grain size of primary phase (μm) | Thickness of alloy layer (μm) | State of alloy layer | Corrosion resistance | Tensile strength (MPa) | Torsion performance | Fatigue limit (MPa) | Fatigue limit/Tensile strength | Remarks |
|---|---|---|---|---|---|---|---|---|---|---|---|---|
| 10' | A' | A1' | 5.2 | 4.2 | 0.7 | A | A | 1864 | 23 | 547 | 0.29 | |
| 11' | A' | A1' | 5.2 | 5.0 | 1.8 | B | A | 1862 | 24 | 514 | 0.28 | |
| 12' | A' | A1' | 5.2 | 4.1 | 0.3 | A | A | 1860 | 23 | 550 | 0.30 | |
| 13' | A' | A1' | 5.2 | 2.2 | 0.2 | A | A | 1865 | 25 | 566 | 0.30 | |
| 14' | A' | A1' | 5.2 | 4.3 | 0.3 | A | A | 1859 | 25 | 563 | 0.30 | |
| 15' | B' | B1' | 7.0 | 4.9 | 2.0 | B | A | 1880 | 22 | 538 | 0.29 | |
| 16' | B' | B1' | 7.0 | 4.6 | 2.0 | B | A | 1878 | 23 | 526 | 0.28 | |
| 17' | B' | B1' | 7.0 | 4.7 | 1.9 | B | A | 1883 | 25 | 545 | 0.29 | |
| 18' | C' | C1' | 5.4 | 4.0 | 0.6 | A | A | 1929 | 24 | 578 | 0.30 | |
| 19' | C' | C1' | 5.4 | 4.2 | 0.7 | A | A | 1945 | 23 | 597 | 0.31 | |
| 20' | C' | C1' | 5.4 | 4.3 | 0.7 | A | A | 1949 | 21 | 583 | 0.30 | |
| 21' | D' | D1' | 6.0 | 2.4 | 1.3 | B | A | 1866 | 23 | 531 | 0.28 | |
| 22' | D' | D1' | 6.0 | 2.3 | 0.3 | A | A | 1860 | 24 | 560 | 0.30 | |
| 23' | E' | E1' | 7.4 | 3.4 | 0.2 | A | A | 1856 | 22 | 557 | 0.30 | |
| 24' | E' | E1' | 7.4 | 3.2 | 0.3 | A | A | 1862 | 24 | 565 | 0.30 | |
| 25' | F' | F1' | 5.2 | 3.3 | 1.8 | B | A | 1975 | 23 | 551 | 0.28 | |
| 26' | F' | F1' | 5.2 | 3.1 | 0.3 | A | A | 1981 | 23 | 591 | 0.30 | |

TABLE 15

| Test No. | Steel No. | Wire rod No. | Wire diameter | Grain size of primary phase (μm) | Thickness of alloy layer (μm) | State of alloy layer | Corrosion resistance | Tensile strength (MPa) | Torsion performance | Fatigue limit (MPa) | Fatigue limit/Tensile strength | Remarks |
|---|---|---|---|---|---|---|---|---|---|---|---|---|
| 27' | G' | G1' | 5.0 | 4.0 | 0.3 | A | A | 1936 | 25 | 585 | 0.30 | Examples of the present invention |
| 28' | G' | G1' | 5.0 | 3.4 | 0.3 | A | A | 1957 | 22 | 578 | 0.30 | |
| 29' | H' | H1' | 7.0 | 4.9 | 2.2 | B | A | 1833 | 21 | 513 | 0.28 | |
| 30' | H' | H1' | 7.0 | 5.3 | 2.4 | B | A | 1831 | 22 | 521 | 0.28 | |
| 31' | I' | I1' | 5.2 | 5.2 | 2.3 | B | A | 1861 | 24 | 529 | 0.28 | |
| 32' | I' | I1' | 5.2 | 3.1 | 0.2 | A | A | 1872 | 25 | 562 | 0.30 | |
| 33' | J' | J1' | 7.0 | 4.4 | 1.9 | B | A | 1880 | 22 | 534 | 0.28 | |
| 34' | J' | J1' | 7.0 | 2.9 | 0.2 | A | A | 1882 | 21 | 575 | 0.31 | |
| 35' | K' | K1' | 5.0 | 4.5 | 2.0 | B | A | 1944 | 21 | 549 | 0.28 | |
| 36' | K' | K1' | 5.0 | 3.9 | 0.3 | A | A | 1955 | 22 | 592 | 0.30 | |
| 37' | K' | K1' | 5.0 | 4.3 | 0.5 | A | A | 1942 | 24 | 611 | 0.31 | |
| 38' | L' | L1' | 4.6 | 4.9 | 2.1 | B | A | 1860 | 23 | 517 | 0.28 | |
| 39' | L' | L1' | 4.6 | 2.8 | 0.2 | A | A | 1869 | 23 | 553 | 0.30 | |
| 40' | L' | L1' | 4.6 | 3.1 | 0.3 | A | A | 1857 | 25 | 548 | 0.30 | |
| 41' | M' | M1' | 7.2 | 6.3 | 2.5 | B | A | 1890 | 21 | 531 | 0.28 | |
| 42' | M' | M1' | 7.2 | 5.0 | 1.2 | A | A | 1885 | 21 | 553 | 0.29 | |
| 43' | N' | N1' | 5.0 | 5.4 | 2.5 | B | A | 1878 | 24 | 535 | 0.28 | |
| 44' | N' | N1' | 5.0 | 2.3 | 1.0 | B | A | 1872 | 23 | 533 | 0.28 | |
| 45' | O' | O1' | 5.2 | 4.5 | 1.8 | B | A | 1917 | 23 | 541 | 0.28 | |
| 46' | O' | O1' | 5.2 | 4.6 | 1.8 | B | A | 1908 | 22 | 530 | 0.28 | |
| 47' | O' | O1' | 5.2 | 4.8 | 1.9 | B | A | 1903 | 24 | 535 | 0.28 | |

TABLE 16

| Test No | Steel No. | Wire rod No. | Wire diameter of plating | Grain size of primary phase (μm) | Thickness of alloy layer (μm) | State of alloy layer | Corrosion resistance | Tensile strength (MPa) | Torsion performance | Fatigue limit (MPa) | Fatigue limit/Tensile strength | Remarks |
|---|---|---|---|---|---|---|---|---|---|---|---|---|
| 48' | P' | P1' | 5.0 | 4.1 | 1.5 | C | B | 1688 | 23 | 460 | 0.27 | Comparative Examples |
| 50' | Q' | Q1' | 7.2 | 4.2 | 1.6 | B | A | 1763 | 22 | 511 | 0.29 | |
| 51' | R' | R1' | 7.0 | 4.2 | 1.6 | B | A | 1797 | 10 | 341 | 0.19 | |
| 52' | A' | A2' | 6.0 | 3.9 | 1.4 | B | A | 1731 | 8 | 359 | 0.21 | |
| 53' | B' | B2' | 6.0 | 4.0 | 1.6 | B | A | 1836 | 11 | 382 | 0.21 | |
| 56' | B' | B3' | 7.0 | 3.8 | 1.4 | B | A | 1823 | 12 | 368 | 0.20 | |
| 57' | E' | E2' | 7.4 | 4.0 | 1.4 | B | A | 1744 | 9 | 326 | 0.19 | |
| 58' | M' | M2' | 7.2 | 4.2 | 1.5 | B | A | 1875 | 7 | 303 | 0.16 | |
| 59' | H' | H1' | 7.0 | 4.1 | 1.5 | B | A | 1927 | 8 | 367 | 0.19 | |
| 60' | O' | O2' | 5.0 | 4.1 | 1.6 | B | A | 2020 | 7 | 393 | 0.19 | |
| 61' | K' | K2' | 5.2 | 3.9 | 1.5 | B | A | 1995 | 4 | 396 | 0.20 | |
| 62' | N' | N1' | 5.0 | 4.2 | 1.6 | B | A | 1764 | 14 | 361 | 0.20 | |
| 63' | D' | D1' | 6.0 | 3.8 | 1.4 | B | A | 1752 | 20 | 368 | 0.21 | |
| 64' | I' | I1' | 5.2 | 4.1 | 0.4 | A | D | 1865 | 21 | 420 | 0.23 | |
| 65' | J' | J1' | 7.0 | 4.2 | 1.6 | C | D | 1876 | 23 | 433 | 0.23 | |
| 66' | K' | K1' | 5.0 | 4.6 | 0.5 | A | A | 1947 | 23 | 323 | 0.17 | |
| 67' | O' | O1' | 5.2 | 10.3 | 5.8 | C | A | 1910 | 20 | 312 | 0.16 | |
| 68' | O' | O1' | 5.2 | 4.4 | 0.3 | A | D | 1908 | 22 | 322 | 0.17 | |
| 49' | A' | A1' | 5.0 | — | 4.5 | D | D | 1679 | 22 | 457 | 0.27 | |

TABLE 16-continued

| Test No | Steel No. | Wire rod No. | Wire diameter of plating | Grain size of primary phase (μm) | Thickness of alloy layer (μm) | State of alloy layer | Corrosion resistance | Tensile strength (MPa) | Torsion performance | Fatigue limit (MPa) | Fatigue limit/Tensile strength | Remarks |
|---|---|---|---|---|---|---|---|---|---|---|---|---|
| 54' | C' | C1' | 5.4 | — | 4.5 | D | D | 1950 | 22 | 527 | 0.27 | |
| 55' | G' | G1' | 5.0 | — | 4.5 | D | D | 1934 | 21 | 520 | 0.27 | |
| 69' | F' | F1' | 5.2 | 1.9 | 12.2 | D | A | 1977 | 20 | 331 | 0.17 | |
| 70' | J' | J1' | 7.0 | 2.1 | 12.2 | D | A | 1885 | 21 | 305 | 0.16 | |
| 71' | L' | L1' | 4.6 | 2.0 | 12.2 | D | A | 1864 | 19 | 329 | 0.18 | |
| 72' | M' | M1' | 7.2 | 2.3 | 12.2 | D | A | 1885 | 20 | 360 | 0.19 | |

TABLE 17

| Steel No. | Chemical composition (mass %) | | | | | | | | | | | | | | | | | |
|---|---|---|---|---|---|---|---|---|---|---|---|---|---|---|---|---|---|---|
| | C | Si | Mn | P | S | Al | N | Cr | Mo | V | Ni | Cu | B | Ti | Nb | Zr | *1 | Remarks |
| A" | 0.91 | 0.89 | 0.50 | 0.007 | 0.011 | 0.029 | 0.0037 | 0.17 | 0.06 | — | — | — | 0.0019 | 0.014 | — | — | 105 | Examples of the present invention |
| B" | 0.93 | 1.02 | 0.49 | 0.009 | 0.004 | 0.033 | 0.0032 | 0.66 | — | — | — | — | — | — | — | — | 117 | |
| C" | 0.98 | 0.97 | 0.29 | 0.005 | 0.005 | 0.030 | 0.0029 | 0.18 | — | 0.07 | — | — | — | — | — | — | 114 | |
| D" | 1.05 | 1.05 | 0.68 | 0.005 | 0.006 | 0.028 | 0.0047 | 0.33 | — | — | — | — | — | — | — | 0.056 | 124 | |
| E" | 1.02 | 1.32 | 0.34 | 0.009 | 0.005 | 0.041 | 0.0041 | 0.20 | — | — | — | — | — | — | — | — | 122 | |
| F" | 1.14 | 1.30 | 0.45 | 0.007 | 0.006 | 0.030 | 0.0025 | 0.15 | — | 0.16 | 0.19 | — | — | — | — | — | 133 | |
| G" | 0.91 | 1.21 | 0.42 | 0.007 | 0.007 | 0.041 | 0.0031 | 0.28 | — | — | — | — | — | — | — | — | 110 | |
| H" | 0.94 | 1.41 | 0.46 | 0.009 | 0.009 | 0.019 | 0.0041 | 0.12 | — | 0.24 | — | — | — | — | — | — | 113 | |
| I" | 0.98 | 1.24 | 0.66 | 0.004 | 0.007 | 0.005 | 0.0024 | 0.33 | 0.10 | — | — | — | 0.0022 | 0.005 | — | — | 118 | |
| J" | 1.08 | 1.15 | 0.28 | 0.008 | 0.009 | 0.027 | 0.0051 | 0.44 | 0.05 | 0.04 | — | — | — | — | — | — | 131 | |
| K" | 1.01 | 0.95 | 0.19 | 0.007 | 0.008 | 0.012 | 0.0040 | 0.26 | 0.07 | — | — | — | — | — | — | — | 119 | |
| L" | 0.96 | 1.37 | 0.35 | 0.007 | 0.008 | 0.009 | 0.0020 | 0.19 | — | — | 0.42 | 0.10 | — | — | — | — | 116 | |
| M" | 0.92 | 2.34 | 0.56 | 0.008 | 0.009 | 0.025 | 0.0040 | 0.08 | — | — | — | — | 0.0010 | 0.008 | — | — | 118 | |
| N" | 0.95 | 1.31 | 0.47 | 0.007 | 0.008 | 0.021 | 0.0030 | 0.10 | — | 0.10 | — | — | 0.0009 | 0.010 | — | — | 112 | |
| O" | 0.98 | 1.78 | 0.57 | 0.006 | 0.009 | 0.035 | 0.0000 | 0.28 | — | — | — | — | — | — | 0.041 | — | 123 | |
| P" | 0.82 | 0.95 | 0.81 | 0.012 | 0.006 | 0.027 | 0.0038 | 0.00 | — | — | — | — | — | — | — | — | 93 | Comparative Examples |
| Q" | 0.91 | 0.98 | 0.41 | 0.006 | 0.005 | 0.031 | 0.0022 | 0.00 | — | — | — | — | — | — | — | — | 104 | |
| R" | 0.93 | 0.57 | 0.32 | 0.007 | 0.007 | 0.044 | 0.0026 | 0.08 | — | — | — | — | — | — | — | — | 104 | |
| S" | 1.26 | 1.56 | 0.84 | 0.006 | 0.006 | 0.036 | 0.0023 | 0.07 | — | — | — | — | — | — | — | — | 146 | |
| T" | 0.98 | 1.46 | 0.57 | 0.006 | 0.009 | 0.039 | 0.0036 | 1.29 | — | — | — | — | — | — | — | — | 137 | |
| U" | 0.91 | 0.83 | 0.87 | 0.008 | 0.008 | 0.023 | 0.0040 | 0.06 | — | — | — | — | — | — | — | — | 102 | |

TABLE 18

| Wire rod No. | Steel No. | Patenting temperature (° C.) | Pearlite block size (μm) | Pearlite fraction (%) | Cementite thickness (μm) | 0.026 × C % (μm) | Tensile strength (MPa) | Difference in tensile strength (MPa) | Remarks |
|---|---|---|---|---|---|---|---|---|---|
| A1" | A" | 540 | 8 | 99 | 0.015 | 0.024 | 1430 | 21 | Examples of the present invention |
| B1" | B" | 585 | 14 | 99 | 0.016 | 0.024 | 1462 | 18 | |
| C1" | C" | 560 | 10 | 99 | 0.015 | 0.025 | 1520 | 27 | |
| D1" | D" | 550 | 9 | 100 | 0.018 | 0.027 | 1509 | 19 | |
| E1" | E" | 535 | 14 | 99 | 0.014 | 0.027 | 1505 | 22 | |
| F1" | F" | 590 | 9 | 100 | 0.021 | 0.030 | 1559 | 20 | |
| G1" | G" | 555 | 13 | 99 | 0.013 | 0.024 | 1420 | 28 | |
| H1" | H" | 570 | 7 | 99 | 0.014 | 0.024 | 1544 | 21 | |
| I1" | I" | 560 | 10 | 99 | 0.016 | 0.025 | 1510 | 16 | |
| J1" | J" | 585 | 7 | 100 | 0.018 | 0.028 | 1546 | 38 | |
| K1" | K" | 555 | 9 | 99 | 0.015 | 0.026 | 1498 | 19 | |
| L1" | L" | 545 | 11 | 99 | 0.014 | 0.025 | 1482 | 20 | |
| M1" | M" | 550 | 13 | 97 | 0.015 | 0.024 | 1490 | 27 | |
| N1" | N" | 560 | 12 | 99 | 0.016 | 0.025 | 1503 | 25 | |
| O1" | O" | 575 | 7 | 99 | 0.015 | 0.025 | 1521 | 21 | |
| P1" | P" | 545 | 18 | 97 | 0.012 | 0.021 | 1261 | 17 | Comparative Examples |
| Q1" | Q" | 560 | 16 | 98 | 0.015 | 0.024 | 1339 | 25 | |
| R1" | R" | 540 | 15 | 98 | 0.013 | 0.024 | 1389 | 24 | |
| S1" | S" | 560 | 14 | 97 | 0.028 | 0.033 | 1510 | 28 | |
| T1" | T" | 540 | 12 | 88 | 0.017 | 0.025 | 1477 | 37 | |
| U1" | U" | 570 | 11 | 98 | 0.016 | 0.024 | 1382 | 26 | |
| B2" | B" | air-cooling | 23 | 99 | 0.020 | 0.024 | 1320 | 81 | |
| F2" | F" | air-cooling | 20 | 98 | 0.036 | 0.030 | 1405 | 119 | |
| J2" | J" | air-cooling | 19 | 99 | 0.031 | 0.028 | 1433 | 143 | |
| B3" | B" | 490 | 14 | 84 | 0.014 | 0.024 | 1441 | 48 | |
| G2" | G" | 645 | 14 | 98 | 0.026 | 0.024 | 1337 | 29 | |
| E2" | E" | 545 | 32 | 99 | 0.014 | 0.027 | 1518 | 42 | |
| G3" | G" | 540 | 29 | 99 | 0.014 | 0.024 | 1426 | 40 | |

TABLE 19

| Test No. | Steel No. | Wire rod No. | Drawing temperature (° C.) | Roller-straightening | Heating (° C. × sec) | Coating method | Al | Si | Fe | Zn | Remarks |
|---|---|---|---|---|---|---|---|---|---|---|---|
| 1" | A" | A1" | 176 | — | — | 1-bath Zn—Al | 10.5 | 0.5 | 0.8 | remainder | Examples of |
| 2" | A" | A1" | 176 | present | — | 1-bath Zn—Al | 10.4 | 0.3 | 0.6 | remainder | the present |
| 3" | A" | A1" | 176 | — | 510 × 3 | 1-bath Zn—Al | 10.5 | 0.2 | 0.4 | remainder | invention |
| 4" | B" | B1" | 154 | — | — | 1-bath Zn—Al | 10.6 | | 3.2 | remainder | |
| 5" | B" | B1" | 154 | present | 495 × 8 | 1-bath Zn—Al | 10.3 | | 3.0 | remainder | |
| 6" | C" | C1" | 160 | — | — | 1-bath Zn—Al | 10.5 | 1.2 | 0.5 | remainder | |
| 7" | C" | C1" | 160 | present | — | 1-bath Zn—Al | 10.5 | 1.5 | 0.4 | remainder | |
| 8" | C" | C1" | 160 | present | 520 × 5 | 1-bath Zn—Al | 10.4 | 1.0 | 0.4 | remainder | |
| 9" | D" | D1" | 172 | present | — | 1-bath Zn—Al | 3.2 | | 2.6 | remainder | |
| 10" | D" | D1" | 172 | present | — | 1-bath Zn—Al | 6.2 | 0.5 | 0.5 | remainder | |
| 11" | D" | D1" | 172 | present | — | 1-bath Zn—Al | 8.5 | | 2.2 | remainder | |
| 12" | D" | D1" | 172 | present | — | 1-bath Zn—Al | 8.3 | 0.2 | 0.5 | remainder | |
| 13" | D" | D1" | 172 | present | — | 1-bath Zn—Al | 10.6 | | 1.9 | remainder | |
| 14" | D" | D1" | 172 | present | — | 1-bath Zn—Al | 10.3 | 0.3 | 0.8 | remainder | |
| 15" | D" | D1" | 172 | present | — | 1-bath Zn—Al | 10.5 | 1.1 | 0.5 | remainder | |
| 16" | D" | D1" | 172 | present | — | 1-bath Zn—Al | 10.4 | 2.0 | 0.6 | remainder | |
| 17" | D" | D1" | 172 | present | — | 1-bath Zn—Al | 12.1 | | 2.3 | remainder | |
| 18" | D" | D1" | 172 | present | — | 1-bath Zn—Al | 12.3 | 0.4 | 0.5 | remainder | |
| 19" | D" | D1" | 172 | present | — | 1-bath Zn—Al | 14.9 | | 2.4 | remainder | |
| 20" | D" | D1" | 172 | present | — | 1-bath Zn—Al | 15.1 | 0.2 | 0.2 | remainder | |
| 21" | D" | D1" | 172 | — | 490 × 10 | 1-bath Zn—Al | 10.5 | 0.5 | 0.4 | remainder | |
| 22" | D" | D1" | 172 | present | 460 × 20 | 1-bath Zn—Al | 10.4 | 0.3 | 0.3 | remainder | |
| 23" | D" | D1" | 172 | — | — | 1-bath Zn—Al | 10.5 | 0.5 | 0.3 | remainder | |
| 24" | E" | E1" | 166 | — | — | 1-bath Zn—Al | 6.1 | | 2.8 | remainder | |
| 25" | E" | E1" | 166 | — | 500 × 7 | 1-bath Zn—Al | 8.5 | | 2.5 | remainder | |
| 26" | E" | E1" | 166 | present | 515 × 5 | 1-bath Zn—Al | 10.7 | | 2.4 | remainder | |
| 27" | F" | F1" | 154 | — | — | 1-bath Zn—Al | 10.5 | 0.4 | 0.8 | remainder | |
| 28" | F" | F1" | 154 | present | — | 1-bath Zn—Al | 10.3 | 0.5 | 0.9 | remainder | |
| 29" | F" | F1" | 154 | present | 540 × 5 | 1-bath Zn—Al | 10.4 | 0.2 | 0.8 | remainder | |

TABLE 20

| Test No. | Steel No. | Wire rod No. | Drawing temperature (° C.) | Roller-straightening | Heating (° C. × sec) | Coating method | Al | Si | Fe | Zn | Remarks |
|---|---|---|---|---|---|---|---|---|---|---|---|
| 30" | G" | G1" | 150 | — | — | 1-bath Zn—Al | 12.3 | 0.6 | 0.8 | remainder | Examples of |
| 31" | G" | G1" | 150 | present | — | 1-bath Zn—Al | 11.9 | 0.4 | 0.7 | remainder | the present |
| 32" | G" | G1" | 150 | — | 505 × 5 | 1-bath Zn—Al | 12.1 | 0.5 | 0.8 | remainder | invention |
| 33" | H" | H1" | 162 | — | — | 1-bath Zn—Al | 10.3 | 0.3 | 0.8 | remainder | |
| 34" | H" | H1" | 162 | — | 480 × 10 | 1-bath Zn—Al | 10.2 | 0.5 | 0.7 | remainder | |
| 35" | H" | H1" | 162 | present | 515 × 7 | 1-bath Zn—Al | 10.5 | 0.4 | 0.6 | remainder | |
| 36" | I" | I1" | 171 | — | — | 1-bath Zn—Al | 10.7 | | 2.5 | remainder | |
| 37" | I" | I1" | 171 | present | 530 × 5 | 1-bath Zn—Al | 10.4 | | 2.7 | remainder | |
| 38" | I" | I1" | 171 | — | 510 × 7 | 1-bath Zn—Al | 10.6 | | 2.6 | remainder | |
| 39" | J" | J1" | 173 | — | — | 1-bath Zn—Al | 11.8 | | 2.4 | remainder | |
| 40" | J" | J1" | 173 | present | — | 1-bath Zn—Al | 12.3 | | 2.5 | remainder | |
| 41" | J" | J1" | 173 | present | 495 × 10 | 1-bath Zn—Al | 12.2 | | 2.3 | remainder | |
| 42" | K" | K1" | 155 | — | — | 1-bath Zn—Al | 10.7 | | 3.4 | remainder | |
| 43" | K" | K1" | 155 | present | 495 × 15 | 1-bath Zn—Al | 10.3 | | 3.3 | remainder | |
| 44" | L" | L1" | 160 | — | — | 1-bath Zn—Al | 10.5 | | 2.4 | remainder | |
| 45" | L" | L1" | 160 | present | — | 1-bath Zn—Al | 10.4 | | 2.3 | remainder | |
| 46" | L" | L1" | 160 | — | 525 × 3 | 1-bath Zn—Al | 10.6 | | 2.3 | remainder | |
| 47" | M" | M1" | 169 | — | — | 1-bath Zn—Al | 6.3 | 1.0 | 0.1 | remainder | |
| 48" | M" | M1" | 169 | present | — | 1-bath Zn—Al | 8.5 | 1.0 | 0.2 | remainder | |
| 49" | M" | M1" | 169 | present | 475 × 12 | 1-bath Zn—Al | 14.9 | 1.8 | 0.1 | remainder | |
| 50" | N" | N1" | 172 | — | — | 1-bath Zn—Al | 10.5 | 0.8 | 0.8 | remainder | |
| 51" | N" | N1" | 172 | — | 505 × 5 | 1-bath Zn—Al | 10.3 | 1.0 | 0.7 | remainder | |
| 52" | N" | N1" | 172 | present | 490 × 12 | 1-bath Zn—Al | 10.6 | 0.8 | 0.8 | remainder | |
| 53" | O" | O1" | 149 | — | — | 1-bath Zn—Al | 10.0 | 0.6 | 0.6 | remainder | |
| 54" | O" | O1" | 149 | present | — | 1-bath Zn—Al | 9.9 | 0.5 | 0.9 | remainder | |
| 55" | O" | O1" | 149 | present | 505 × 8 | 1-bath Zn—Al | 10.2 | 0.4 | 0.7 | remainder | |

TABLE 21

| Test No. | Steel No. | Wire rod No. | Drawing temperature (° C.) | Roller-straightening | Heating (° C. × sec) | Coating method | Coating composition (mass %) | | | | Remarks |
|---|---|---|---|---|---|---|---|---|---|---|---|
| | | | | | | | Al | Si | Fe | Zn | |
| 56" | P" | P1" | 178 | — | — | 1-bath Zn—Al | 10.4 | 0.4 | 0.8 | remainder | Comparative |
| 57" | Q" | Q1" | 159 | present | 460 × 10 | 1-bath Zn—Al | 10.3 | 0.5 | 0.7 | remainder | Examples |
| 58" | R" | R1" | 165 | — | 480 × 7 | 1-bath Zn—Al | 10.5 | 0.6 | 0.7 | remainder | |
| 59" | S" | S1" | 165 | present | — | 1-bath Zn—Al | 10.7 | 0.3 | 0.8 | remainder | |
| 60" | T" | T1" | 172 | — | 515 × 10 | 1-bath Zn—Al | 10.4 | 0.5 | 0.8 | remainder | |
| 61" | U" | U1" | 168 | present | 470 × 5 | 1-bath Zn—Al | 10.5 | 0.5 | 0.6 | remainder | |
| 62" | B" | B2" | 166 | present | — | 1-bath Zn—Al | 10.6 | 0.3 | 0.7 | remainder | |
| 63" | F" | F2" | — | — | — | — | — | — | — | — | |
| 64" | J" | J2" | 168 | present | — | 1-bath Zn—Al | 10.5 | | 2.3 | remainder | |
| 65" | B" | B3" | 172 | — | 520 × 5 | 1-bath Zn—Al | 10.5 | | 2.3 | remainder | |
| 66" | G" | G2" | 175 | present | — | 1-bath Zn—Al | 10.3 | | 2.4 | remainder | |
| 67" | E" | E2" | 176 | present | — | 1-bath Zn—Al | 10.7 | 0.6 | 0.7 | remainder | |
| 68" | G" | G3" | 162 | present | — | 1-bath Zn—Al | 10.4 | 0.3 | 0.7 | remainder | |
| 69" | C" | C1" | 245 | present | — | 1-bath Zn—Al | 10.4 | 0.5 | 0.8 | remainder | |
| 70" | G" | G1" | 239 | present | — | 1-bath Zn—Al | 10.6 | 0.4 | 0.6 | remainder | |
| 71" | L" | L1" | 278 | present | — | 1-bath Zn—Al | 10.5 | 0.4 | 0.8 | remainder | |
| 72" | A" | A1" | 176 | — | 590 × 20 | 1-bath Zn—Al | 10.3 | 0.6 | 0.8 | remainder | |
| 73" | M" | M1" | 169 | present | 530 × 100 | 1-bath Zn—Al | 10.6 | 0.5 | 0.7 | remainder | |
| 74" | B" | B1" | 154 | present | 495 × 8 | Zn | | | 3.6 | remainder | |
| 75" | D" | D1" | 172 | — | 490 × 10 | Zn | | | 4.1 | remainder | |
| 76" | F" | F1" | 154 | — | — | Zn | | | 3.9 | remainder | |
| 77" | D" | D1" | 172 | present | — | 2-bath Zn—Al | 12.5 | | 4.8 | remainder | |
| 78" | H" | H1" | 162 | present | 515 × 7 | 2-bath Zn—Al | 12.3 | 0.3 | 5.2 | remainder | |
| 79" | J" | J1" | 173 | — | — | 2-bath Zn—Al | 12.6 | | 5.5 | remainder | |
| 80" | M" | M1" | 169 | — | 475 × 12 | 2-bath Zn—Al | 12.4 | 0.3 | 5.3 | remainder | |
| 81" | D" | D1" | 172 | present | — | 1-bath Zn—Al | 2.7 | | 1.1 | remainder | |
| 82" | D" | D1" | 172 | present | — | 1-bath Zn—Al | 2.9 | | 2.3 | remainder | |
| 83" | D" | D1" | 172 | present | — | 1-bath Zn—Al | 10.9 | 2.9 | 0.5 | remainder | |
| 84" | D" | D1" | 172 | present | — | 1-bath Zn—Al | 12.3 | 8.5 | | remainder | |
| 85" | D" | D1" | 172 | present | — | 1-bath Zn—Al | 2.8 | 3.1 | 0.3 | remainder | |

TABLE 22

| Test No. | Steel No. | Wire rod No. | Wire diameter | Grain size of primary phase (μm) | Thickness of alloy layer (μm) | State of alloy layer | Corrosion resistance | Tensile strength (MPa) | Minimal torsion number (n) | Fatigue limit (MPa) | Fatigue limit/Tensile strength | Remarks |
|---|---|---|---|---|---|---|---|---|---|---|---|---|
| 1" | A" | A1" | 5.2 | 4.3 | 0.7 | A | A | 2049 | 23 | 601 | 0.29 | Examples |
| 2" | A" | A1" | 5.2 | 3.8 | 0.5 | A | A | 2053 | 24 | 608 | 0.30 | of the |
| 3" | A" | A1" | 5.2 | 3.1 | 0.3 | A | A | 2041 | 25 | 619 | 0.30 | present |
| 4" | B" | B1" | 7.4 | 5.0 | 2.5 | C | A | 2132 | 21 | 583 | 0.27 | invention |
| 5" | B" | B1" | 7.4 | 4.9 | 2.4 | C | A | 2119 | 23 | 591 | 0.28 | |
| 6" | C" | C1" | 5.0 | 4.0 | 0.4 | A | A | 2150 | 21 | 648 | 0.30 | |
| 7" | C" | C1" | 5.0 | 3.8 | 0.3 | A | A | 2154 | 23 | 657 | 0.31 | |
| 8" | C" | C1" | 5.0 | 3.7 | 0.3 | A | A | 2143 | 24 | 661 | 0.31 | |
| 9" | D" | D1" | 7.0 | 5.2 | 2.1 | B | C | 2094 | 20 | 594 | 0.28 | |
| 10" | D" | D1" | 7.0 | 3.7 | 0.4 | A | B | 2094 | 22 | 638 | 0.30 | |
| 11" | D" | D1" | 7.0 | 4.1 | 1.7 | B | A | 2096 | 21 | 606 | 0.29 | |
| 12" | D" | D1" | 7.0 | 3.8 | 0.4 | A | A | 2095 | 23 | 642 | 0.31 | |
| 13" | D" | D1" | 7.0 | 3.5 | 1.5 | B | A | 2097 | 22 | 613 | 0.29 | |
| 14" | D" | D1" | 7.0 | 4.4 | 0.7 | A | A | 2091 | 22 | 638 | 0.31 | |
| 15" | D" | D1" | 7.0 | 4.0 | 0.4 | A | A | 2098 | 23 | 646 | 0.31 | |
| 16" | D" | D1" | 7.0 | 4.3 | 0.5 | A | A | 2095 | 21 | 648 | 0.31 | |
| 17" | D" | D1" | 7.0 | 4.2 | 1.8 | B | A | 2096 | 23 | 615 | 0.29 | |
| 18" | D" | D1" | 7.0 | 4.1 | 0.4 | A | A | 2096 | 22 | 641 | 0.31 | |
| 19" | D" | D1" | 7.0 | 4.6 | 1.9 | B | A | 2097 | 21 | 602 | 0.29 | |
| 20" | D" | D1" | 7.0 | 3.8 | 0.2 | A | A | 2094 | 22 | 644 | 0.31 | |
| 21" | D" | D1" | 7.0 | 3.5 | 0.3 | A | A | 2085 | 21 | 628 | 0.30 | |
| 22" | D" | D1" | 7.0 | 3.8 | 0.2 | A | A | 2088 | 24 | 650 | 0.31 | |
| 23" | D" | D1" | 7.0 | 3.7 | 0.2 | A | A | 2090 | 24 | 649 | 0.31 | |
| 24" | E" | E1" | 5.0 | 5.0 | 2.2 | C | B | 2070 | 21 | 588 | 0.28 | |
| 25" | E" | E1" | 5.0 | 4.2 | 2.1 | B | A | 2065 | 23 | 606 | 0.29 | |
| 26" | E" | E1" | 5.0 | 4.0 | 1.9 | B | A | 2063 | 24 | 608 | 0.29 | |
| 27" | F" | F1" | 6.8 | 3.9 | 0.7 | A | A | 2219 | 20 | 639 | 0.29 | |
| 28" | F" | F1" | 6.8 | 4.3 | 0.8 | A | A | 2234 | 21 | 663 | 0.30 | |
| 29" | F" | F1" | 6.8 | 4.2 | 0.7 | A | A | 2196 | 23 | 668 | 0.30 | |

TABLE 23

| Test No. | Steel No. | Wire rod No. | Wire diameter | Grain size of primary phase (μm) | Thickness of alloy layer (μm) | State of alloy layer | Corrosion resistance | Tensile strength (MPa) | Minimal torsion number (n) | Fatigue limit (MPa) | Fatigue limit/Tensile strength | Remarks |
|---|---|---|---|---|---|---|---|---|---|---|---|---|
| 30" | G" | G1" | 4.4 | 4.1 | 0.7 | A | A | 2083 | 23 | 610 | 0.29 | Examples |
| 31" | G" | G1" | 4.4 | 3.8 | 0.6 | A | A | 2080 | 24 | 621 | 0.30 | of the |
| 32" | G" | G1" | 4.4 | 4.2 | 0.7 | A | A | 2077 | 26 | 627 | 0.30 | present |
| 33" | H" | H1" | 5.2 | 4.4 | 0.7 | A | A | 2106 | 21 | 615 | 0.29 | invention |
| 34" | H" | H1" | 5.2 | 3.9 | 0.5 | A | A | 2102 | 23 | 623 | 0.30 | |
| 35" | H" | H1" | 5.2 | 3.7 | 0.5 | A | A | 2094 | 23 | 636 | 0.30 | |
| 36" | I" | I1" | 5.0 | 3.9 | 2.0 | B | A | 2155 | 21 | 625 | 0.29 | |
| 37" | I" | I1" | 5.0 | 4.3 | 2.2 | B | A | 2132 | 23 | 611 | 0.29 | |
| 38" | I" | I1" | 5.0 | 4.0 | 2.1 | B | A | 2146 | 22 | 631 | 0.29 | |
| 39" | J" | J1" | 5.6 | 3.7 | 1.9 | B | A | 2166 | 21 | 625 | 0.29 | |
| 40" | J" | J1" | 5.6 | 4.2 | 2.0 | B | A | 2168 | 23 | 631 | 0.29 | |
| 41" | J" | J1" | 5.6 | 3.6 | 1.8 | B | A | 2160 | 25 | 633 | 0.29 | |
| 42" | K" | K1" | 7.0 | 8.0 | 2.7 | C | A | 2055 | 21 | 558 | 0.27 | |
| 43" | K" | K1" | 7.0 | 7.6 | 2.5 | C | A | 2044 | 22 | 562 | 0.27 | |
| 44" | L" | L1" | 5.0 | 4.0 | 2.0 | B | A | 2089 | 21 | 602 | 0.29 | |
| 45" | L" | L1" | 5.0 | 3.7 | 1.8 | B | A | 2087 | 23 | 615 | 0.29 | |
| 46" | L" | L1" | 5.0 | 3.9 | 1.9 | B | A | 2072 | 22 | 617 | 0.30 | |
| 47" | M" | M1" | 4.8 | 1.9 | 0.1 | A | B | 2037 | 20 | 644 | 0.32 | |
| 48" | M" | M1" | 4.8 | 2.1 | 0.2 | A | A | 2039 | 23 | 646 | 0.32 | |
| 49" | M" | M1" | 4.8 | 1.8 | 0.1 | A | A | 2016 | 25 | 648 | 0.32 | |
| 50" | N" | N1" | 6.6 | 4.1 | 0.7 | A | A | 2096 | 22 | 611 | 0.29 | |
| 51" | N" | N1" | 6.6 | 3.7 | 0.6 | A | A | 2078 | 24 | 620 | 0.30 | |
| 52" | N" | N1" | 6.6 | 3.9 | 0.7 | A | A | 2075 | 24 | 623 | 0.30 | |
| 53" | O" | O1" | 5.0 | 3.4 | 0.5 | A | A | 2168 | 20 | 645 | 0.30 | |
| 54" | O" | O1" | 5.0 | 4.3 | 0.8 | A | A | 2172 | 23 | 646 | 0.30 | |
| 55" | O" | O1" | 5.0 | 3.6 | 0.7 | A | A | 2150 | 24 | 659 | 0.31 | |

TABLE 24

| Test No. | Steel No. | Wire rod No. | Wire diameter after plating | Grain size of primary phase (μm) | Thickness of alloy layer (μm) | State of alloy layer | Corrosion resistance | Tensile strength (MPa) | Minimal torsion number (n) | Fatigue limit (MPa) | Fatigue limit/Tensile strength | Remarks |
|---|---|---|---|---|---|---|---|---|---|---|---|---|
| 56" | P" | P1" | 5.2 | 4.2 | 0.7 | A | A | 1862 | 24 | 559 | 0.30 | Comparative |
| 57" | Q" | Q1" | 7.4 | 3.9 | 0.6 | A | A | 1963 | 23 | 557 | 0.28 | Examples |
| 58" | R" | R1" | 6.0 | 4.0 | 0.6 | A | A | 1924 | 22 | 546 | 0.28 | |
| 59" | S" | S1" | 5.0 | 4.3 | 0.7 | A | A | 2249 | 11 | 408 | 0.18 | |
| 60" | T" | T1" | 5.0 | 4.3 | 0.7 | A | A | 2096 | 9 | 365 | 0.17 | |
| 61" | U" | U1" | 7.2 | 3.8 | 0.5 | A | A | 1922 | 23 | 511 | 0.27 | |
| 62" | B" | B2" | 7.4 | 4.1 | 0.6 | A | A | 1870 | 13 | 351 | 0.19 | |
| 63" | F" | F2" | — | — | — | — | — | — | — | — | — | |
| 64" | J" | J2" | 5.6 | 3.7 | 1.9 | B | A | 2072 | 7 | 330 | 0.16 | |
| 65" | B" | B3" | 7.4 | 3.6 | 1.8 | B | A | 2056 | 8 | 371 | 0.18 | |
| 66" | G" | G2" | 4.4 | 4.1 | 2.0 | B | A | 1905 | 12 | 324 | 0.17 | |
| 67" | E" | E2" | 5.0 | 3.9 | 0.6 | A | A | 2096 | 14 | 376 | 0.18 | |
| 68" | G" | G3" | 4.4 | 4.0 | 0.6 | A | A | 2102 | 16 | 379 | 0.18 | |
| 69" | C" | C1" | 5.0 | 4.4 | 0.7 | A | A | 2176 | 12 | 415 | 0.19 | |
| 70" | G" | G1" | 4.4 | 3.6 | 0.5 | A | A | 2107 | 10 | 402 | 0.19 | |
| 71" | L" | L1" | 5.0 | 4.3 | 0.7 | A | A | 2099 | 8 | 396 | 0.19 | |
| 72" | A" | A1" | 5.2 | 4.2 | 0.7 | A | A | 1954 | 15 | 384 | 0.20 | |
| 73" | M" | M1" | 4.8 | 3.8 | 0.6 | A | A | 1967 | 19 | 478 | 0.24 | |
| 74" | B" | B1" | 7.4 | — | 4.7 | D | D | 2120 | 21 | 530 | 0.25 | |
| 75" | D" | D1" | 7.0 | — | 4.7 | D | D | 2087 | 22 | 502 | 0.24 | |
| 76" | F" | F1" | 6.8 | — | 4.7 | D | D | 2215 | 22 | 538 | 0.24 | |
| 77" | D" | D1" | 7.0 | 1.9 | 12.1 | D | A | 2085 | 21 | 334 | 0.16 | |
| 78" | H" | H1" | 5.2 | 2.0 | 12.3 | D | A | 2093 | 23 | 335 | 0.16 | |
| 79" | J" | J1" | 5.6 | 2.0 | 12.2 | D | A | 2149 | 21 | 344 | 0.16 | |
| 80" | M" | M1" | 4.8 | 2.2 | 12.4 | D | A | 2009 | 24 | 324 | 0.16 | |
| 81" | D" | D1" | 7.0 | 1.9 | 1.0 | A | D | 2094 | 21 | 563 | 0.27 | |
| 82" | D" | D1" | 7.0 | 4.2 | 1.8 | C | D | 2091 | 23 | 556 | 0.27 | |
| 83" | D" | D1" | 7.0 | 3.4 | 0.5 | A | A | 2095 | 22 | 378 | 0.18 | |
| 84" | D" | D1" | 7.0 | 9.8 | 5.8 | C | B | 2095 | 21 | 398 | 0.19 | |
| 85" | D" | D1" | 7.0 | 3.1 | 0.2 | A | D | 2096 | 22 | 386 | 0.18 | |

What is claimed is:

1. A high-strength Zn—Al coated steel wire for bridges comprising:
   a steel wire; and
   a Zn—Al coating having a coating body layer and an Fe—Al alloy layer formed in an interface between a surface layer of the steel wire and the coating body layer,
   wherein a chemical composition of a core material of the steel wire consists of, by mass %:
   C: 0.70% to 1.2%;
   Si: 0.01% to 2.5%;
   Mn: 0.01% to 0.9%;
   P: limited to 0.02% or less;
   S: limited to 0.02% or less;
   N: limited to 0.01% or less; and
   a balance including Fe and unavoidable impurities,
   wherein wire-drawn pearlite is the most abundant microstructure among microstructures of the core material of the steel wire;
   wherein an average composition of the Zn—Al coating consists of, by mass %:
   Al: 3.0 to 15.0%;
   Si: 0.2% to 1.5%;
   Fe: limited to 3.0% or less, and
   a balance including Zn and unavoidable impurities,
   wherein the Fe—Al alloy layer has a thickness of 5 μm or less and comprises an outer layer and an inner layer,
   wherein an $Al_{3.2}Fe$ columnar grain is the most abundant microstructure among microstructures in the outer layer,
   wherein $Al_5Fe_2$ columnar grain is the most abundant microstructure among microstructures in the inner layer,
   wherein the outer layer is located closer to the coating body layer than the inner layer, and the inner layer is located closer to the surface layer of the steel wire than the outer layer,
   wherein the Zn—Al coating further comprises an Fe—Al—Si granular grain layer between the outer layer of the Fe—Al alloy layer and the coating body layer.

2. The high-strength Zn—Al coated steel wire for bridges according to claim 1,
   wherein a primary phase of the coating body layer has a diameter of 10 μm or less, and
   wherein the wire-drawn pearlite comprises 90% or more of the microstructures of the core material of the steel wire.

3. The high-strength Zn—Al coated steel wire for bridges according to claim 1 or 2, wherein the average composition of the Zn—Al coating includes, by mass %,
   Al: 6.0 to 15.0%.

4. The high-strength Zn—Al coated steel wire for bridges according to claim 1 or 2, wherein a torsion number before fracture during a torsion test is at least 18 times.

5. The high-strength Zn—Al coated steel wire for bridges according to claim 1 or 2, wherein a ratio of fatigue limit under partial pulsating tension to tensile strength is 0.22 or higher.

6. A method for manufacturing a high-strength Zn—Al coated steel wire for bridges according to claim 1 or 2, the method comprising:
   wire-drawing the steel wire at a temperature of 250° C. or less;
   pickling the steel wire with acid;
   treating the steel wire with a flux; and
   coating the flux-treated steel wire with Zn—Al,
   wherein the coating with Zn—Al is the only coating process comprised in the method for manufacturing the coated steel wire.

7. The method for manufacturing the high-strength Zn—Al coated steel wire for bridges according to claim 6, wherein the coating with Zn—Al is carried out by immersing the wire-drawn steel wire in molten Zn—Al bath containing, by mass %, Al: 3.0% to 15.0%.

8. The method for manufacturing the high-strength Zn—Al coated steel wire for bridges according to claim 6, the method further comprising:
   hot-rolling the steel material; and
   patenting the steel material by immersion in salt bath at 500° C. to 600° C. after the hot-rolling.

9. The method for manufacturing the high-strength Zn—Al coated steel wire for bridges according to claim 6, wherein the coating with Zn—Al is carried out by immersing the wire-drawn steel wire in a molten Zn—Al bath, wherein
   the molten Zn—Al bath further contains, by mass %,
   Si: 1.5% or less, and
   the average composition of Zn—Al coating further comprises, by mass %,
   Si: 0.01% to 1.5%.

10. The method for manufacturing the high-strength Zn—Al coated steel wire for bridges according to claim 7, wherein
    the molten Zn—Al bath contains, by mass %,
    Al: 6.0% to 15%, and
    the average composition of Zn—Al coating includes, by mass %,
    Al: 6.0 to 15.0%.

11. The method for manufacturing the high-strength Zn—Al coated steel wire for bridges according to claim 6, the method further comprising, after the wire-drawing, at least one of:
    roller-straightening; and
    heating the steel wire at 400° C. to 500° C. for 1 sec to 60 sec.

12. A high-strength Zn—Al coated steel wire for bridges comprising:
    a steel wire; and
    a Zn—Al coating having a coating body layer and an Fe—Al alloy layer formed in an interface between a surface layer of the steel wire and the coating body layer,
    wherein a chemical composition of a core material of the steel wire consists of, by mass %:
    C: 0.70% to 1.2%;
    Si: 0.01% to 2.5%;
    Mn: 0.01% to 0.9%;
    P: limited to 0.02% or less;
    S: limited to 0.02% or less;
    N: limited to 0.01% or less;
    Cr: 0% to 0.5%,
    Ni: 0% to 1.0%,
    Cu: 0% to 0.5%,
    Mo: 0% to 0.5%,
    V: 0% to 0.5%,
    B: 0% to 0.0070%,
    Al: 0% to 0.1%,
    Ti: 0% to 0.1%,
    Nb: 0% to 0.05%,
    Zr: 0% to 0.1%, and
    a balance including Fe and unavoidable impurities,
    wherein wire-drawn pearlite is the most abundant microstructure among microstructures of the core material of the steel wire, wherein an average composition of the Zn—Al coating consists of, by mass %:
Al: 3.0 to 15.0%;
Si: 0.2% to 1.5%;
Fe: limited to 3.0% or less, and
a balance including Zn and unavoidable impurities,
wherein the Fe—Al alloy layer has a thickness of 5 μm or less and comprises an outer layer and an inner a layer,
wherein an $Al_{3.2}Fe$ columnar grain is the most abundant microstructure among microstructures in the outer layer,
wherein $Al_5Fe_2$ columnar grain is the most abundant microstructure among microstructures in the inner layer,
wherein the outer layer is located closer to the coating body layer than the inner layer, and the inner layer is located closer to the surface layer of the steel wire than the outer layer,
wherein the Zn—Al coating further comprises an Fe—Al—Si granular grain layer between the outer layer of the Fe—Al alloy layer and the coating body layer.

* * * * *